US010091125B2

(12) United States Patent
Raju et al.

(10) Patent No.: US 10,091,125 B2
(45) Date of Patent: Oct. 2, 2018

(54) USING DIFFERENT TCP/IP STACKS WITH SEPARATELY ALLOCATED RESOURCES

(71) Applicant: Nicira, Inc., Palo Alto, CA (US)

(72) Inventors: Nithin B. Raju, Sunnyvale, CA (US); Ganesan Chandrashekhar, Campbell, CA (US); Gopakumar Pillai, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 667 days.

(21) Appl. No.: 14/231,707

(22) Filed: Mar. 31, 2014

(65) Prior Publication Data
US 2015/0281112 A1 Oct. 1, 2015

(51) Int. Cl.
G06F 15/173 (2006.01)
H04L 12/911 (2013.01)
G06F 9/455 (2018.01)

(52) U.S. Cl.
CPC .......... H04L 47/70 (2013.01); G06F 9/45533 (2013.01)

(58) Field of Classification Search
CPC .............................. G06F 9/45533; H04L 47/70
USPC ........ 709/203, 226–227, 230, 245; 370/419; 711/100
See application file for complete search history.

(56) References Cited

U.S. PATENT DOCUMENTS

| | | |
|---|---|---|
| 5,265,092 A | 11/1993 | Soloway et al. |
| 5,867,660 A | 2/1999 | Schmidt et al. |
| 6,018,787 A * | 1/2000 | Ip ........................ G06F 12/063 326/39 |
| 6,345,301 B1 | 2/2002 | Burns et al. |
| 6,718,535 B1 | 4/2004 | Underwood |
| 6,964,008 B1 * | 11/2005 | Van Meter, III .... G06F 11/1004 714/766 |
| 7,079,544 B2 | 7/2006 | Wakayama et al. |
| 7,209,977 B2 | 4/2007 | Archarya et al. |
| 7,274,706 B1 * | 9/2007 | Nguyen ................ H04L 12/56 370/419 |

(Continued)

OTHER PUBLICATIONS

U.S. Appl. No. 14/231,702, filed Mar. 31, 2014, Raju, Nithin B., et al.

(Continued)

*Primary Examiner* — Thuong Nguyen
(74) *Attorney, Agent, or Firm* — Adeli LLP

(57) ABSTRACT

Multiple TCP/IP stack processors on a host. The multiple TCP/IP stack processors are provided independently of TCP/IP stack processors implemented by virtual machines on the host. The TCP/IP stack processors provide multiple different default gateway addresses for use with multiple processes. The default gateway addresses allow a service to communicate across an L3 network. Processes outside of virtual machines that utilize the TCP/IP stack processor on a first host can benefit from using their own gateway, and communicate with their peer process on a second host, regardless of whether the second host is located within the same subnet or a different subnet. The multiple TCP/IP stack processors can use separately allocated resources. Separate TCP/IP stack processors can be provided for each of multiple tenants on the host. Separate loopback interfaces of multiple TCP/IP stack processors can be used to create separate containment for separate sets of processes on a host.

21 Claims, 20 Drawing Sheets

(56) References Cited

U.S. PATENT DOCUMENTS

| | | |
|---|---|---|
| 7,406,540 B2 | 7/2008 | Acharya et al. |
| 7,591,011 B1 * | 9/2009 | Droux ................. H04L 12/4641 |
| | | 380/200 |
| 7,774,501 B2 | 8/2010 | Dillon |
| 2003/0065711 A1 | 4/2003 | Acharya et al. |
| 2004/0225691 A1 * | 11/2004 | Hirao .................... G06F 3/0605 |
| 2004/0267897 A1 | 12/2004 | Hill et al. |
| 2005/0053079 A1 | 3/2005 | Havala |
| 2005/0132044 A1 | 6/2005 | Guingo et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0206655 A1 | 9/2006 | Chappell et al. |
| 2007/0055789 A1 | 3/2007 | Claise et al. |
| 2008/0151893 A1 | 6/2008 | Nordmark et al. |
| 2011/0153715 A1 * | 6/2011 | Oshins .................. G06F 9/5088 |
| | | 709/203 |
| 2013/0067485 A1 * | 3/2013 | Shamilian ........... G06F 9/45533 |
| | | 718/104 |
| 2014/0359134 A1 * | 12/2014 | Yoshida ................ G06F 9/4856 |
| | | 709/226 |

OTHER PUBLICATIONS

U.S. Appl. No. 14/231,705, filed Mar. 31, 2014, Raju, Nithin B., et al.
U.S. Appl. No. 14/231,708, filed Mar. 31, 2014, Raju, Nithin B., et al.
Portions of prosecution history of U.S. Appl. No. 14/231,702, filed Jul. 31, 2015, Raju, Nithin B., et al.
Touch, J., et al., "Transparent Interconnection of Lots of Links (TRILL): Problem and Applicability Statement," May 2009, pp. 1-17, IETF Trust, RFC 5556.

* cited by examiner

USING DIFFERENT TCP/IP STACKS WITH SEPARATELY ALLOCATED RESOURCES

BACKGROUND

Some current data centers run server virtualization software on compute nodes. These compute nodes, also known as hypervisor nodes, generate lots of network traffic that includes traffic originating from the virtual machines, as well as lot infrastructure traffic. Infrastructure traffic is traffic that originates from the hypervisor layer rather than the virtual machines. The end point IP addresses in infrastructure traffic are the hypervisor addresses. Some examples of the different kinds of traffic originated at the hypervisor are: management traffic (i.e., network traffic used to manage the hypervisors), virtual machine migrator traffic (i.e., network traffic generated when a virtual machine is moved from one host to another host); storage traffic (i.e., network traffic generated when a virtual machine accesses it's virtual disk hosted on a network share (Network Attached Storage (NAS) such as Network File System (NFS) or Direct Attached Storage (DAS) such as Virtual Storage Area Network (VSAN)); virtual machine traffic encapsulated by the hypervisor. (i.e., network traffic between virtual machines that is encapsulated using technologies such as a Virtual Extensible Local Area Network (VXLAN)).

In some current systems, flows of these different traffic types are segregated at the level of network fabric using virtual local area networks (VLANs) for various reasons. In some cases, the flows are segregated for reasons related to isolation in terms of security as well as quality of service. Under such a scheme, typically the hypervisor host at which the traffic originates is responsible for adding corresponding VLAN tags as the packets leave the host. In order to achieve this goal, a hypervisor host typically maintains one or more virtual network interfaces (such as eth[0 . . . n] on Linux or vmk[0 . . . n] on ESX) for each of the VLANs. In the presence of multiple IP interfaces on different VLANs, a sender application does one of the following, while sending out a packet on the host: first, explicitly specify the virtual interface to egress the packet. This is useful for cases where sender application wants to implement a multi-pathing type of send behavior.

Such implementations have the following disadvantages: (a) the intelligence as to which interface to use has to be built into each application that uses VLAN interfaces; (b) in some ways, such an implementation bypasses the IP routing table and as such can have issues when the application's implementation for working with a routing table is not consistent with the underlying TCP/IP stack processor's routing table. Second, the sender application may rely on the hypervisor's TCP/IP stack processor to make a decision based on the routing table on the host. This relies on standard routable table behavior where typically each VLAN is assigned a different subnet address, and based on the destination IP address, the system determines which interface to use.

Some systems operate differently depending on whether or not the destination IP address of the hypervisor for a flow is directly reachable via a Layer 2 (L2) network. If the destination hypervisor for that flow is directly reachable via an L2 network (i.e., the source and destination are on the same subnet), the sender's TCP/IP stack processor does not have to use the default gateway route, and routing is straightforward. However, if the destination hypervisor is not directly reachable via an L2 network (i.e., the source and destination are on different subnets); the sender's TCP/IP stack processor will have to rely on a gateway for sending packets to the destination subnet. This is especially important when the destination hypervisor is reachable via a long distance network connection where routers and gateways of L3 networks are the norm.

Since a TCP/IP stack processor of current systems supports only one default gateway, the gateway for the management traffic takes that spot in current systems. However, as explained above, other flows may not be able to reach their gateway address, if the gateway is on a different subnet/VLAN.

One method of addressing this issue in current systems is by using multiple non-default gateway addresses in the IP routing tables of a single TCP/IP stack processor. However, the current system of managing static routes for adding non-default gateways suffers from the following issues: (1) it is cumbersome and error prone; (2) It is also seen as a security risk, so many entities that use data centers and enterprise networks do not implement static routes.

The consequence of not having multiple non-default gateways in current systems is that those sender applications that rely on an L3 gateway to reach their counterpart on another hypervisor cannot get their functionality to work. As a result of which, virtual machine migrators, storage and similar hypervisor services do not work across Layer 3 (L3) boundaries in current systems. This is especially relevant when these services are expected to work long distance or in a spine-leaf network topology.

Spine-Leaf is a well-understood network topology that provides for maximum utilization of network links in terms of bandwidth. The idea is to define an access switch layer of Top of Rack (ToR) switches connect to hypervisors on the south side, and to a layer of aggregate switches on the north side. The aggregate layer switches form the spine. The access layer switches and the hypervisors form the leaves of the network. The key aspect of this topology is that the access switches define the L2 network boundary on the south side. In other words, they terminate VLANs. To reach from one access switch to another access switch, some systems rely on L3 network routing rather than extending the L2 network fabric. This puts many of the hypervisor services such as virtual machine migrators and storage under risk since they rely on L2 network connectivity.

In some current systems, multiple network applications run on a hypervisor host. Each of these applications can be very network intensive and can consume resources from the underlying TCP/IP stack processor and render other applications without resources. Some situations can be as bad as a user not being able to use secure shell (SSH) to reach the hypervisor host, since the heap space is used up completely by one of the other applications.

In some current systems, if a hypervisor is hosting workload/virtual machines of multiple tenants, security is of paramount importance. At the network level, putting the different tenants on different VLANs or physical network fabric provides security/isolation. However, in current systems, at each hypervisor host, there is one TCP/IP stack processor providing transport for all these different tenants and flows. This is potentially a gap in the security model, since the flows can mix at the level of the hypervisor.

Data is sent on networks as individual packets. One type of packet is an Internet protocol (IP) packet. Data is generated by processes on a machine (e.g., a host machine). The data is then sent to a TCP/IP stack processor to transform the data into packets addressed to the destination of the data. A TCP/IP stack processor is a series of networking protocols that transform data from various processes into IP packets capable of being sent over networks such as the Internet.

Data is transferred across networks in individual packets. Each packet includes at least a header, with a source and destination address, and a body of data. As a data packet is transformed by each layer of a TCP/IP stack processor, the protocols of the layers may add or remove fields from the header of the packet. The end result of the transformation by the TCP/IP stack processor is that a data payload is encapsulated in headers that allow the packet to traverse an internet protocol (IP) network.

Data centers and enterprise networks with multiple hosts implement a single TCP/IP stack processor on each host to handle the creation of IP packets, outside of virtual machines on the host, for sending on IP networks. The single TCP/IP stack processor also parses IP packets that are received from other processes on the host and from machines and processes outside of the host.

The single TCP/IP stack processor of existing networks provides IP packet creation and parsing for a wide variety of processes operating on the host. However, there are disadvantages to using a single TCP/IP stack processor for all processes operating on a host outside of virtual machines on the host. For example, it is possible for one process to use all the available IP packet bandwidth and/or resources of the TCP/IP stack processor, leaving other processes unable to communicate with machines and processes outside the host through IP packets. Furthermore, a single TCP/IP stack processor is limited to a single default gateway for sending packets with destination addresses that are not in routing tables of the TCP/IP stack processor.

BRIEF SUMMARY

Some embodiments of the invention provide multiple TCP/IP stack processors on a host of a datacenter or enterprise network. In some embodiments, the multiple TCP/IP stack processors on a host machine are provided independently of TCP/IP stack processors implemented on virtual machines operating on the host machine. Various different embodiments of the present invention provide different advantages over existing systems.

In some embodiments, at least two different TCP/IP stack processors on the same host machine use different default gateway addresses. Particular processes are assigned to use a particular TCP/IP stack processor with a dedicated default gateway address in some embodiments. The particular processes of these embodiments are able to communicatively connect (through the dedicated default gateway address) to machines and/or processes on other local networks (sometimes called subnets) without a user manually setting up a static routing table to enable such communication. In some embodiments, a subnetwork, or subnet, is a logically visible subdivision of an IP network. In some embodiments, communications within a subnet travel through an L2 network, while communications between different subnets (e.g., at different geographical locations) travel through an L3 network. Thereby, processes outside of virtual machines that utilize the TCP/IP stack processor on a first host can benefit from using their own gateway, and talk to their peer process on a second host, regardless where the second host is located—within the same subnet or different subnet.

Multiple TCP/IP stack processors implemented on a host outside of virtual machines of the host, in some embodiments, use separately allocated resource pools (e.g., separately allocated memory) rather than using a common resource pool. By using separately allocated resource pools, the TCP/IP stack processors do not interfere with each other. For example, with separate resources, it is not possible for one or more TCP/IP stack processor to use up all available resources and leave another TCP/IP stack processor without any available resources.

A virtual machine is a software computer that, like a physical computer, runs an operating system and applications. Multiple virtual machines can operate on the same host system concurrently. In some datacenters, multiple tenants have virtual machines running on the same host. In some embodiments, processes on a host that relate to different tenants are assigned to separate TCP/IP stack processors. The datacenters of some embodiments assign exclusive use of different TCP/IP stack processors to different tenants. Because the different tenants are using different TCP/IP stack processors, the possibility that a bug or crashing process will expose data belonging to one tenant to another tenant is reduced or eliminated.

In some embodiments, multiple TCP/IP stack processors are set up for multiple sets of processes. The processes within a particular set of processes are able to communicate with each other by using a loopback interface of the TCP/IP stack processor assigned to that set of processes. The TCP/IP stack processors with loopbacks of some embodiments provide virtual containers for multiple processes. In some embodiments, the processes are user space processes. In some embodiments, the processes are kernel space processes. In some embodiments, the processes are a combination of user space and kernel space processes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide multiple TCP/IP stack processors on a host of a datacenter or enterprise network. In some embodiments, the multiple TCP/IP stack processors are provided on a host machine independently of TCP/IP stack processors implemented by virtual machines on the host machine. Various different embodiments of the present invention provide different advantages over existing systems.

Figure 1:
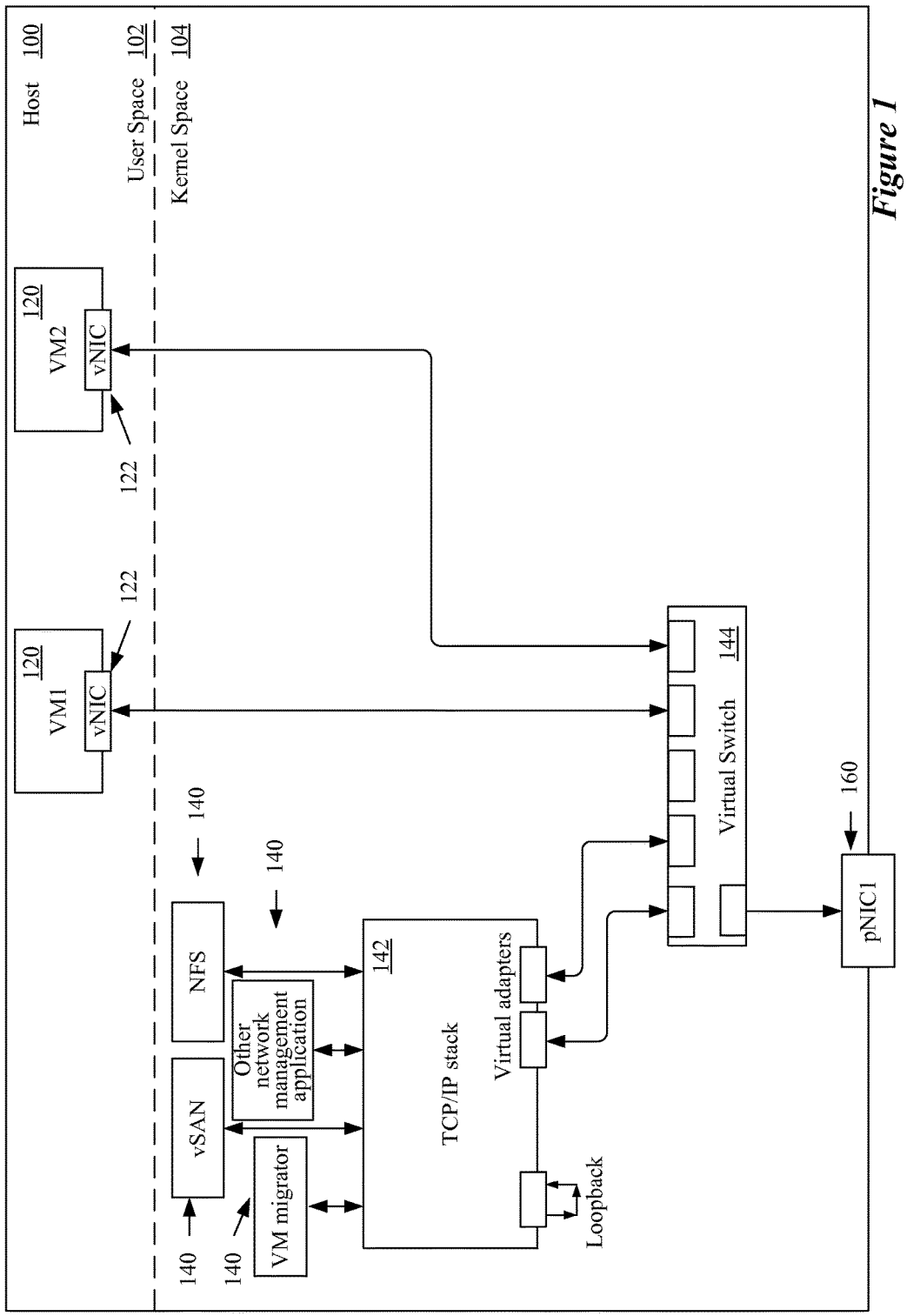
FIG. 1 illustrates a host computer implementing a single TCP/IP stack processor for non-virtual machine processes.

The multiple TCP/IP stack processors of some embodiments are described in sections I-V, below. However, the following description provides context for host systems that implement the multiple TCP/IP stack processors. In particular, the following description covers a prior art host with a single TCP/IP stack processor outside of virtual machines of the host. FIG. 1 illustrates a host computer implementing a single TCP/IP stack processor for non-virtual machine processes. The figure shows a prior art system in which all data, to be sent via internet protocol, that is produced outside the virtual machines on the host passes through a single TCP/IP stack processor. The figure includes a host machine 100 that implements a user space 102 and a kernel space 104. In the user space 102, the host 100 implements virtual machines 120 with virtual network interface cards (vNICs) 122. In the kernel space 104, the host 100 implements multiple network processes 140, TCP/IP stack processor 142, and virtual switch 144. The host machine 100 includes a physical network interface card (pNIC) 160. For reasons of space, the TCP/IP stack processors of any of the figures described herein are labeled "TCP/IP stacks".

Host machine 100 could be a host machine on a multi-tenant datacenter or a host machine on a single tenant enterprise network. The user space 102 and kernel space 104 are divisions of the computing capabilities of the host machine 100 and may be implemented using different sets of application programming interfaces (APIs). Accordingly, processes running in the user space 102 may have different restrictions on them, and/or have access to different resources, than processes running in the kernel space 104. The virtual machines 120 simulate separate computers. The virtual machines 120 can be virtual machines controlled by a single entity (e.g., a single tenant) or can be controlled by multiple entities (e.g., multiple tenants). The virtual network interface cards (vNICs) 122 are software constructs that the virtual machines 120 use to connect to a virtual switch 144 in the kernel space 104 of the host 100. Virtual switches are sometimes referred to as software switches. In some embodiments, the network processes 140 are hypervisor services. Hypervisor services are processes or components implemented within the hypervisor that are used to control and service the virtual machines on the host. In some embodiments, hypervisor services do not include processes running on a virtual machine. Some hypervisor services require network access. That is, the services require data to be processed by a TCP/IP stack processor to produce packets and sent over a network, such as the Internet. Examples of such type of hypervisor services include, in some embodiments, a virtual machine migrator that transfers a virtual machine between hosts, virtual storage area network (vSAN) that aggregates locally attached disks in a hypervisor cluster to create a storage solution that can be provisioned remotely through a client, a network file system (NFS) component that can be used to mount storage drive remotely, etc.

TCP/IP stack processor 142 is a software construct that manipulates data received from various network processes 140, converting the data into IP packets that can be sent through the virtual switch 144 and then out to a network (e.g., a public datacenter, an enterprise network, the Internet, etc.). A TCP/IP stack processor is used to process data through several different layers. For instance, when outputting data, the data may be sent to a socket buffer and processed at the TCP layer to create TCP segments or packets. Each segment is then processed by a lower layer, such as the IP layer to add an IP header. The output of the network stack is a set of packets associated with outbound data flow. On the other hand, when receiving data at the host machine, each packet may be processed by one or more of the layers in reverse order to strip one or more headers, and place the user data or payload in an input socket buffer.

In some cases, a TCP/IP stack processor 142 includes one or more virtual interfaces (e.g., a vmknic from VMware®) to connect to one or more virtual switches (or in some cases to connect directly to a pNIC). Virtual switch 144 is a software construct that receives IP packets from within the host 100 and routes them toward their destinations (inside or outside the host 100). The virtual switch 144 also receives packets from outside the host 100 and routes them to their destinations in the host 100. The pNIC 160 is a hardware element that receives packets from within the host 100 that have destinations outside the host and forwards those packets toward their destinations. The pNIC 160 also receives packets from outside the host (e.g., from a local network or an external network such as the Internet) and forwards those packets to the virtual switch 144 for distribution within the host 100.

The term "packet" is used here as well as throughout this application to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

The system of FIG. 1 generates all IP packets (other than those from the virtual machines) in a single TCP/IP stack processor 142. The TCP/IP stack processor 142 is a stack of protocols that together translate data from the various processes 140 into IP packets that can be sent out on an IP network (e.g., the Internet). The TCP/IP stack processor 142 does not send the packets directly to their destinations. Instead, the TCP/IP stack processor sends the IP packets to the virtual switch 144, which is a "next hop" in the direction of the ultimate destination of the IP packets. The virtual switch 144 examines each IP packet individually to determine whether the destination of the packet is to a process running on the host 100 or to a process or machine outside of the host 100. When an IP packet is addressed to a destination on the host 100, the virtual switch 144 sends the IP packet to the destination process on the host 100. When an IP packet is addressed to a destination not on the host 100, the virtual switch forwards the IP packet to the pNIC 160 to be sent out of the host 100. The pNIC 160 then sends the IP packet to a network (not shown) for further forwarding to its destination. While the prior art system of FIG. 1 is adequate for some purposes, the present invention improves on the system by providing multiple TCP/IP stack processors on a host.

I. Multiple TCP/IP Stack Processors on a Host Machine

In some embodiments, a hypervisor runs on a computer of a multi-computer network (e.g., a multi-tenant datacenter or a single tenant enterprise network). A hypervisor is a piece of computer software that allows multiple virtual machines to run independently on a computer at the same time in some embodiments. The hypervisor handles various management tasks, such as memory management, processor scheduling, or any other operations for controlling the execution of virtual machines. In some embodiments, the hypervisor runs on an operating system of the host. Such hypervisor is also referred to as a hosted hypervisor. In other embodiments, the hypervisor runs on the host without a separate operating system running (this is sometimes called "running on the bare metal"). In some embodiments, a hypervisor allows the virtual machines to run separate operating systems. In some embodiments, a virtual machine is a software computer (e.g., a simulated computer) that, like a physical computer, runs an operating system and applications. Multiple virtual machines can operate on the same host system concurrently.

Figure 2:
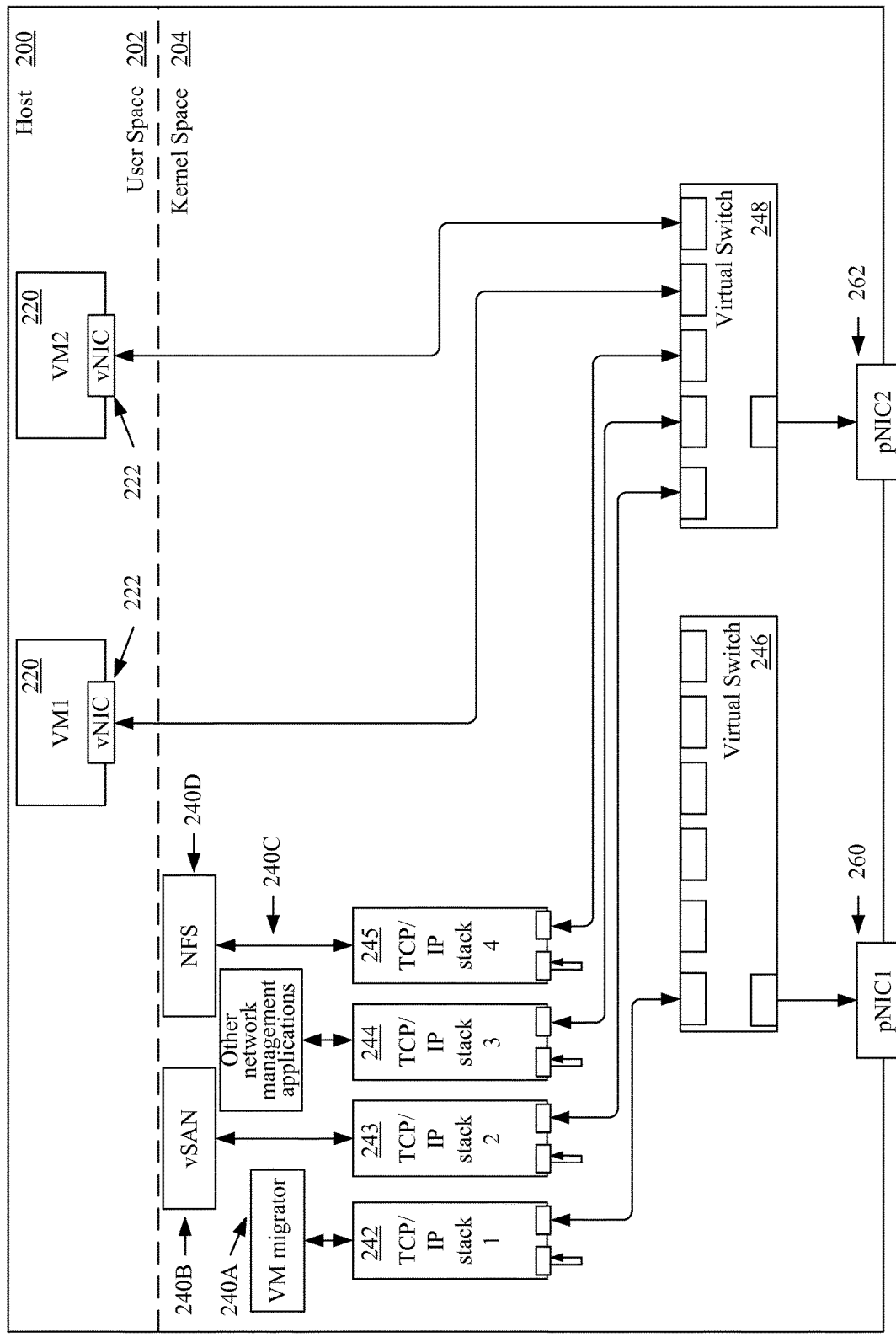
FIG. 2 illustrates a host computer implementing multiple TCP/IP stack processors for non-virtual machine processes.

Various embodiments employ multiple TCP/IP stack processors for processes on a host outside of virtual machines. In some embodiments, each TCP/IP stack processor uses the same set of protocols. In other embodiments, some TCP/IP stack processors use different sets of protocols. The following sections provide more details on the uses and features of multiple TCP/IP stack processors on a host. This section provides a general description of a system with multiple TCP/IP stack processors on a host. FIG. 2 illustrates a host computer implementing multiple TCP/IP stack processors for non-virtual machine processes. The figure shows a new system in which IP network traffic that is produced outside the virtual machines on the host passes through one out of a set of multiple TCP/IP stack processors on the host. The figure includes a host machine 200 that implements a user space 202 and a kernel space 204. In the user space 202, the host 200 implements virtual machines 220 with virtual network interface cards (vNICs) 222. In the kernel space 204, the host 200 implements multiple network processes 240A-240D, TCP/IP stack processors 242-245, and virtual switches 246 and 248. The host machine 200 includes physical network interface cards (pNICs) 260 and 262.

Host machine 200 could be a host machine on a multi-tenant datacenter or a host machine on a single tenant enterprise network. The user space 202 and kernel space 204 are divisions of the computing capabilities of the host machine 200 and may be implemented using different sets of application programming interfaces (APIs). Accordingly, processes running in the user space 202 may have different restrictions on them, and/or have access to different resources, than processes running in the kernel space 204. The virtual machines 220 simulate separate computers. The virtual machines 220 can be machines controlled by a single entity (e.g., a single tenant) or can be controlled by multiple entities (e.g., multiple tenants). The virtual network interface cards (vNICs) 222 are software constructs that the virtual machines 220 use to connect to virtual switch 248.

TCP/IP stack processors 242-245 are software constructs that manipulate data received from various network processes 240A-240D, converting the data into IP packets that can be sent through one of the virtual switches 246 and 248 and then out to an IP network (e.g., a public datacenter, an enterprise network, the Internet, etc.). Virtual switches 246 and 248 are software constructs that receive IP packets from within the host 200 and route them toward their destinations (inside or outside the host 200). The virtual switches 246 and 248 also receive packets from outside the host 200 and route them to their destinations in the host 200. The pNICs 260 and 262 are hardware elements that receive IP packets from within the host that have destinations outside the host and forward those packets toward their destinations. The pNICs 260 and 262 also receive IP packets from outside the host 200 (e.g., from a local network or an external network such as the Internet) and forwards those packets to the virtual switches 246 and 248, for distribution within the host 200.

The system of FIG. 2 generates IP packets for each of processes 240A-240D (other than those processes running on the virtual machines) in a separate TCP/IP stack processor 242-245, respectively. The TCP/IP stack processors 242-245 are stacks of protocols that separately translate data from the various processes 240A-240D into IP packets that can be sent out on a network. Examples of processes assigned to different TCP/IP stack processors include a virtual machine migrator 240A, virtual storage area network (vSAN) 240B, other network management applications 240C, which may include one or more different processes, and network file system (NFS) 240D. TCP/IP stack processors 242, 243, and 245 each provide TCP/IP operations for a single process. TCP/IP stack processor 244 is a generic TCP/IP stack processor that provides TCP/IP operations for multiple processes. In some embodiments, some or all of the multiple TCP/IP stack processors are each associated with multiple processes.

The TCP/IP stack processors 242-245 do not send the packets directly to their destinations. Instead, the TCP/IP stack processors send the IP packets to the virtual switches 246 and 248, which are the "next hops" in the direction of the ultimate destinations of the IP packets. The virtual switches 246 and 248 examine each IP packet individually to determine whether the destination of the packet is to a process or virtual machine directly addressable by the particular virtual switch that receives the packet (e.g., an address of a virtual machine or process served by the same virtual switch) or to a process or virtual machine not directly addressable by that particular switch (e.g., an address on an external machine or a process or virtual machine served by the other virtual switch). When an IP packet is addressed to a destination that is directly addressable by the particular virtual switch 246 or 248, then that virtual switch 246 or 248 sends the IP packet to the destination on the host 200. When an IP packet is addressed to a destination not on the host 200, the virtual switch 246 or 248 forwards the IP packet to the pNIC 260 or 262 (i.e., the pNIC associated with that particular virtual switch) to be sent out of the host 200. The pNIC 260 or 262 then sends the packet to a network (not shown) for further forwarding to its destination.

In some embodiments, separate virtual switches 246 and 248 closest to the source and destination of an IP packet do not have a direct connection (such as the embodiment of FIG. 2). In some such embodiments, an IP packet received at one virtual switch 246 or 248, but addressed to a process associated with a different virtual switch will be sent out of the host through one pNIC, and then sent by an external network to the other pNIC. The other pNIC then sends the IP packet to the virtual switch associated with the destination address. The IP packet is then forwarded to the TCP/IP stack processor (or virtual machine) associated with that destination address for further processing before the data is sent to the process (on the host or on a virtual machine) to which the packet is addressed.

In the above described embodiments and the other embodiments illustrated herein, two virtual switches are not corrected directly in order to avoid loops in the network. However, in some alternate embodiments, two or more virtual switches on a host are directly connected to each other (e.g., each has a virtual port connected to the other). In some such embodiments, when an IP packet, received at one virtual switch, is addressed to a process associated with the other virtual switch, the receiving virtual switch forwards the IP packet to the destination virtual switch. The packet is then forwarded to the TCP/IP stack processor associated with that address for further processing before the data is sent to the process to which it is addressed.

Different embodiments use various different arrangements of TCP/IP stack processors, virtual switches, and pNICs. In FIG. 2, most of the TCP/IP stack processors (TCP/IP stack processors 243-245) and the virtual machines 220 connect to one virtual switch 248. In contrast, the only TCP/IP stack processor to connect to virtual switch 246 is TCP/IP stack processor 242. Such an embodiment may be used when one of the processes particularly needs unimpeded access to the network.

In some embodiments, some or all of multiple data structures of each TCP/IP stack processor are fully independent of the other TCP/IP stack processors. Some relevant examples of these separate data structures are: separate routing tables including the default gateway; isolated lists (separate sets) of interfaces, including separate loopback interfaces (e.g., IP address 127.0.0.0/8); separate ARP tables, separate sockets/connections, separate locks, and in some embodiments, separate memory and heap allocations.

Figure 3:
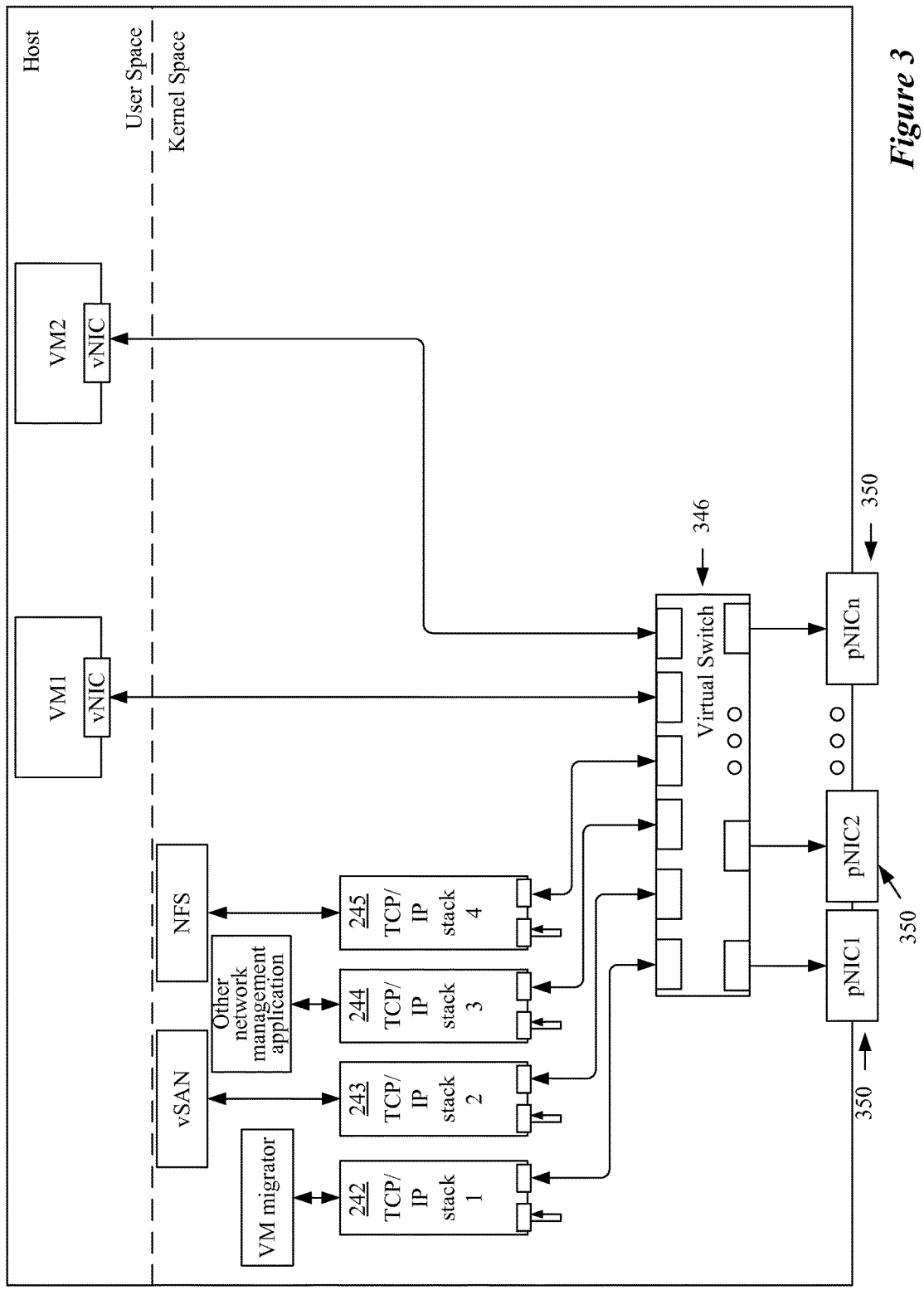
FIG. 3 illustrates an embodiment in which a single virtual switch connects to multiple TCP/IP stack processors and multiple pNICs.
Figure 4:
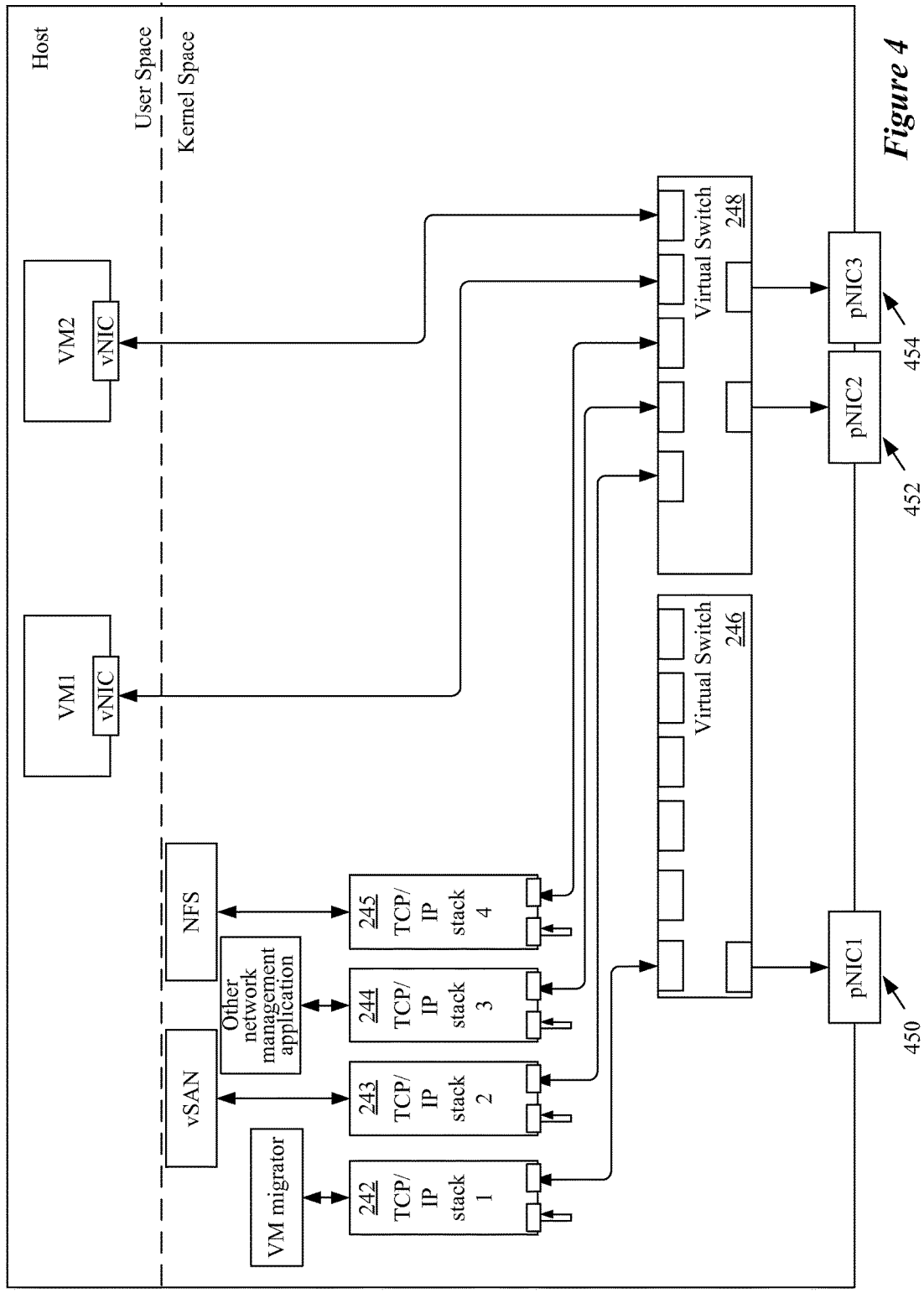
FIG. 4 illustrates an embodiment in which one virtual switch connects to a single TCP/IP stack processor and a single pNIC and another virtual switch connects to multiple TCP/IP stack processors and multiple pNICs.

FIGS. 3-4 illustrate alternate embodiments for connecting multiple TCP/IP stack processors to a network. FIG. 3 illustrates an embodiment in which a single virtual switch connects to multiple TCP/IP stack processors and multiple pNICs. The figure includes virtual switch 346 and pNICs 350. The TCP/IP stack processors 242-245 each connect to a port of the virtual switch 346. The virtual switch 346 also includes ports that each connects to one of the pNICs 350. In some such embodiments, each TCP/IP stack processor 242-245 uses a particular pNIC, while in other embodiments, TCP/IP stack processors 242-245 use different pNICs at different times. Such an embodiment may be used when none of the processes needs greater access to the network than the others.

FIG. 4 illustrates an embodiment in which one virtual switch connects to a single TCP/IP stack processor and a single pNIC and another virtual switch connects to multiple TCP/IP stack processors and multiple pNICs. The figure includes virtual switches 446 and 448, and pNICs 450-454. The TCP/IP stack processor 242 connects to a port of virtual switch 446. The virtual switch 446 also connects to pNIC 450. The TCP/IP stack processors 243-245 each connect to a port of the virtual switch 448. The virtual switch 448 also includes ports that connect to pNICs 452 and 454. Such an embodiment may be used when one of the processes needs the best access to the network and the other processes need better access to the network than a single pNIC can provide.

II. Multiple Default Gateways

When an IP packet is received by a network routing element such as a switch, virtual switch, TCP/IP stack processor, etc., the network routing element determines whether the destination address is an address found in routing tables of the network routing element. When the destination address is found in the routing tables of the network routing element, the routing tables indicate where the IP packet should be sent next. The routing tables do not provide explicit instructions to cover every possible destination address. When the destination address is not found in the routing tables of the network routing element (e.g., when the IP packet is to an unknown address), the network routing element sends the received IP packet to a default address. Such a default address is referred to as a "default gateway" or a "default gateway address". Each TCP/IP stack processor has one default gateway address. In some cases, it is advantageous to send packets from a particular process to a particular default gateway address that is different from the generic default gateway address for other processes on the host. Accordingly, some embodiments provide multiple TCP/IP stack processors in order to provide multiple default gateway addresses. The processes of some embodiments send out IP packets to addresses outside of a local network (e.g., over an L3 network). Network hardware and software components receive data (e.g., IP packets) with destination addresses indicating where the packet should be sent.

The TCP/IP stack processors of some embodiments include routing tables. In some embodiments, the routing tables are the same for each TCP/IP stack processor. In other embodiments, one or more TCP/IP stack processors has a different routing table from at least one of the other TCP/IP stack processors. When a TCP/IP stack processor receives data to be processed into an IP packet with a destination IP address that the TCP/IP stack processor does not recognize (e.g., an address not in the routing table), the TCP/IP stack processor forwards that packet to a default gateway of the TCP/IP stack processor. In some embodiments, one or more TCP/IP stack processors uses a different default gateway from at least one of the other TCP/IP stack processors.

Some hosting systems, in a datacenter or enterprise network, segregate network traffic originating from processes running on a host outside of virtual machines. In some cases, this segregation is achieved using virtual local area networks (VLANs) or a similar technology. In such cases, each of multiple services producing that traffic ends up using a different subnet address. Thereby, the services need a separate gateway in order to reach a second such host located in a different subnet. As mentioned above, prior art systems set up such gateways using static routes. However, such static routes do not work "out of the box" (e.g., without user configuration).

The separate default gateways of TCP/IP stack processors of some embodiments make adding static routes to a TCP/IP stack processor (to configure multiple gateways) unnecessary. Some embodiments have a default/management stack, which preserves the notion of a "primary" gateway for services that use a generic TCP/IP stack processor. However, for any service, such as a virtual machine migrator, that uses an L3 gateway to communicate between different subnets, a dedicated TCP/IP stack processor with a default gateway that is independent of the gateway of the generic TCP/IP stack processor provides communications across L3 networks. In some embodiments, the dedicated TCP/IP stack processor allows a virtual machine migrator to work "out of the box" without user configuration (sometimes referred to as manual configuration). Dedicated TCP/IP stack processors also allow other services that communicate across L3 networks to work "out of the box" without user configuration.

Accordingly, some embodiments create a TCP/IP stack processor for each service. For each TCP/IP stack processor, the default gateway can be configured through mechanisms such as DHCP. In some embodiments, some services use different default gateways from the management network gateway and some services use the same default gateway as the management network. A separate TCP/IP stack processor can handle either case.

Figure 5:
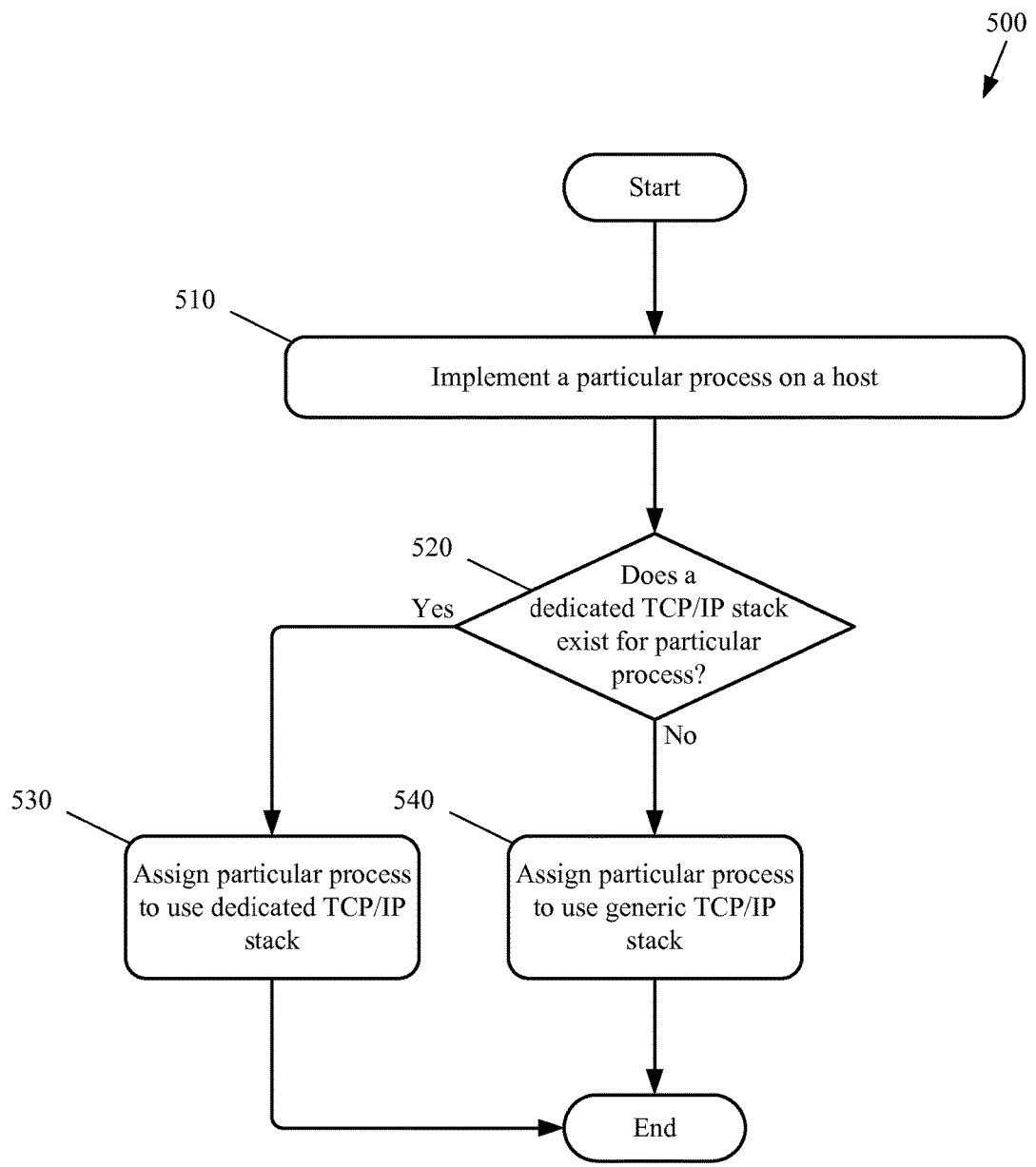
FIG. 5 conceptually illustrates a process of some embodiments for assigning processes to TCP/IP stack processors.

In some embodiments, multiple TCP/IP stack processors are implemented when the host machine boots up. In some such embodiments, one or more dedicated TCP/IP stack processors are used for an individual process (or a selected group of processes) while another TCP/IP stack processor is used as a generic TCP/IP stack processor for processes that are not assigned to a dedicated TCP/IP stack processor. In some embodiments, a virtual interface is implemented for a TCP/IP stack processor once the TCP/IP stack processor is implemented. FIG. 5 conceptually illustrates a process 500 of some embodiments for assigning a process to a TCP/IP stack processor. The process 500 implements (at 510) a particular process on a host machine. In some embodiments, the particular process is a virtual machine migrator, a network storage process, a fault tolerance application or another network management process. Some examples of such processes are processes 140 of FIG. 1.

The process 500 then determines (at 520) whether the implemented process uses a dedicated TCP/IP stack processor. In some embodiments, the determination is made by retrieving configuration data from a configuration file that identifies the TCP/IP stack processor that the process should use. If the implemented process is configured to use a dedicated TCP/IP stack processor, then the process 500 assigns (at 530) the implemented process to that dedicated TCP/IP stack processor. For example, in some embodiments a virtual machine migrator is assigned to a dedicated TCP/IP stack processor. FIG. 2, above, illustrates a host with a virtual machine migrator assigned to a specific TCP/IP stack processor 242. If the implemented process does not use a dedicated TCP/IP stack processor, then the process 500 assigns (at 540) the implemented process to a generic TCP/IP stack processor. In FIG. 2, the other network management applications 240C, which include one or more processes, are assigned to a generic TCP/IP stack processor 244.

Figure 6:
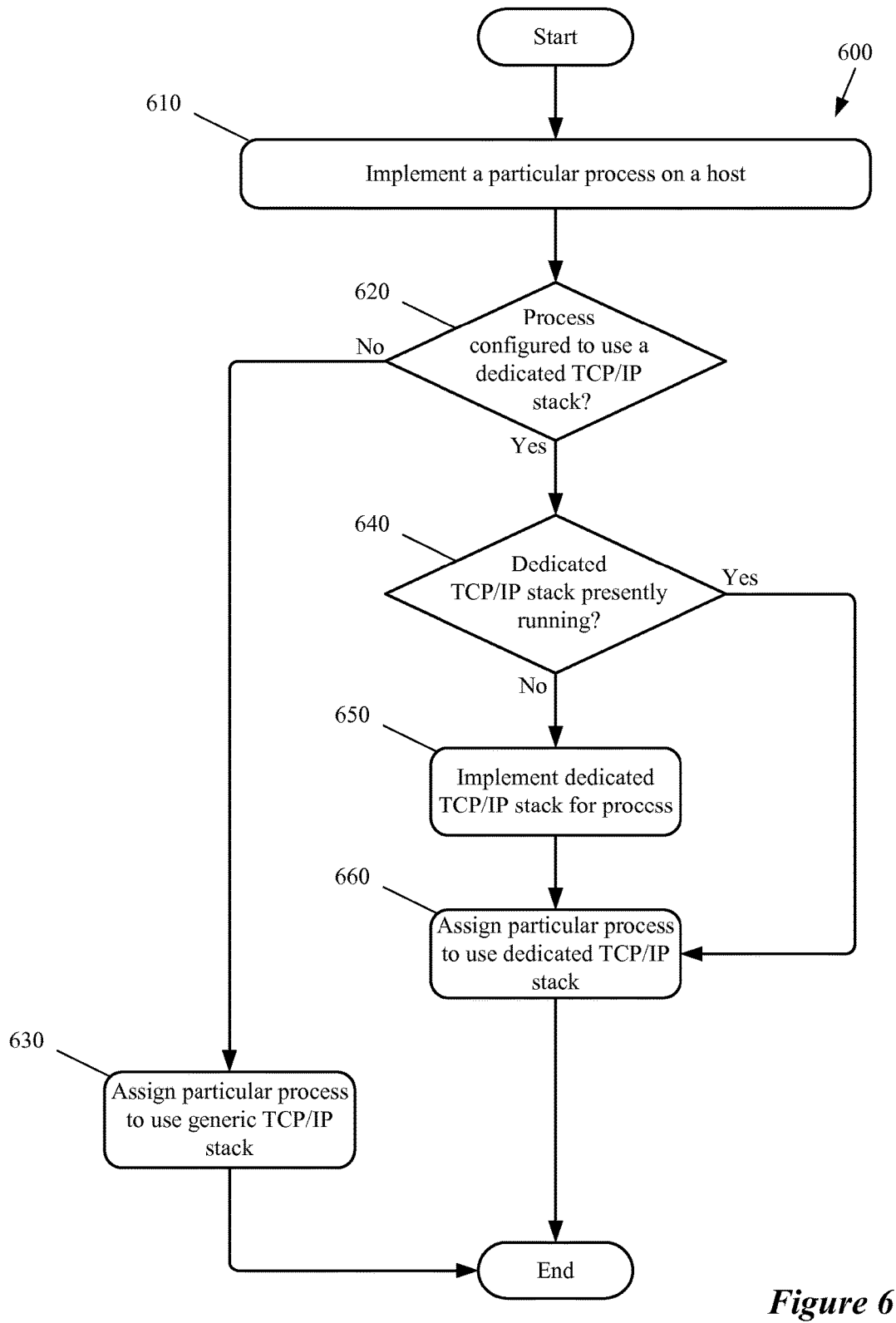
FIG. 6 conceptually illustrates a process of some embodiments for implementing a dedicated TCP/IP stack processor as needed and assigning a process to the dedicated TCP/IP stack processor.

In contrast to the embodiment illustrated in FIG. 5, in some embodiments, a generic TCP/IP stack processor is implemented when the host machine boots up, but one or more dedicated TCP/IP stack processors are implemented only as needed (e.g., when the processes they serve are implemented). In some such embodiments, one or more dedicated TCP/IP stack processors are used for an individual process (or a selected group of processes) while another TCP/IP stack processor is used as a generic TCP/IP stack processor for processes that are not assigned to a dedicated TCP/IP stack processor. In some embodiments, a virtual interface is implemented for a TCP/IP stack processor once the TCP/IP stack processor is implemented. In some embodiments where a process uses an existing TCP/IP processor, a new virtual interface is added to the TCP/IP stack processor for the process to use. FIG. 6 conceptually illustrates a process 600 of some embodiments for implementing a dedicated TCP/IP stack processor as needed and assigning a process to the dedicated TCP/IP stack processor. The process 600 implements (at 610) a particular process on a host machine. In some embodiments, the particular process is a virtual machine migrator, a network storage process, a fault tolerance application or another network management process. Some examples of such processes are processes 140 of FIG. 1.

The process 600 then determines (at 620) whether the implemented process is configured to use a dedicated TCP/IP stack processor. In some embodiments, the determination is made by retrieving configuration data from a configuration file that identifies the TCP/IP stack processor that the process should use. When the implemented process is not configured to use a dedicated TCP/IP stack processor, then the process 600 assigns (at 630) the implemented process to a generic TCP/IP stack processor and then the process 600 ends. For example, in some embodiments a network storage process is assigned to a dedicated TCP/IP stack processor.

When the implemented process is configured to use a dedicated TCP/IP stack processor, the process 600 determines (at 640) whether the TCP/IP stack processor that the implemented process is configured to use is already running. When the TCP/IP stack processor that the implemented process is configured to use is not already running, the process 600 implements (at 650) the TCP/IP stack processor that the implemented process is configured to use, then proceeds to operation 660. When the dedicated TCP/IP stack processor that the implemented process is configured to use is already running, the process 600 assigns (at 660) the implemented process to use the dedicated TCP/IP stack processor.

In some embodiments, more than one process will use the same dedicated TCP/IP stack processor. In such embodiments, a dedicated TCP/IP stack processor may already be running when a process that uses that TCP/IP stack processor is implemented because another process that uses that TCP/IP stack processor is already running. In some embodiments, a particular dedicated TCP/IP stack processor may continue to run for some time after the process which uses it stops running. In such embodiments, the dedicated TCP/IP stack processor may still be running the next time the process that uses it is implemented.

FIG. 2, above, illustrates a host with a virtual machine migrator assigned to a specific TCP/IP stack processor 242.

If the implemented process does not use a dedicated TCP/IP stack processor, then the process 600 assigns (at 640) the implemented process to a generic TCP/IP stack processor. In FIG. 2, the other network management applications 240C, which include one or more processes, are assigned to a generic TCP/IP stack processor 244.

Figure 7:
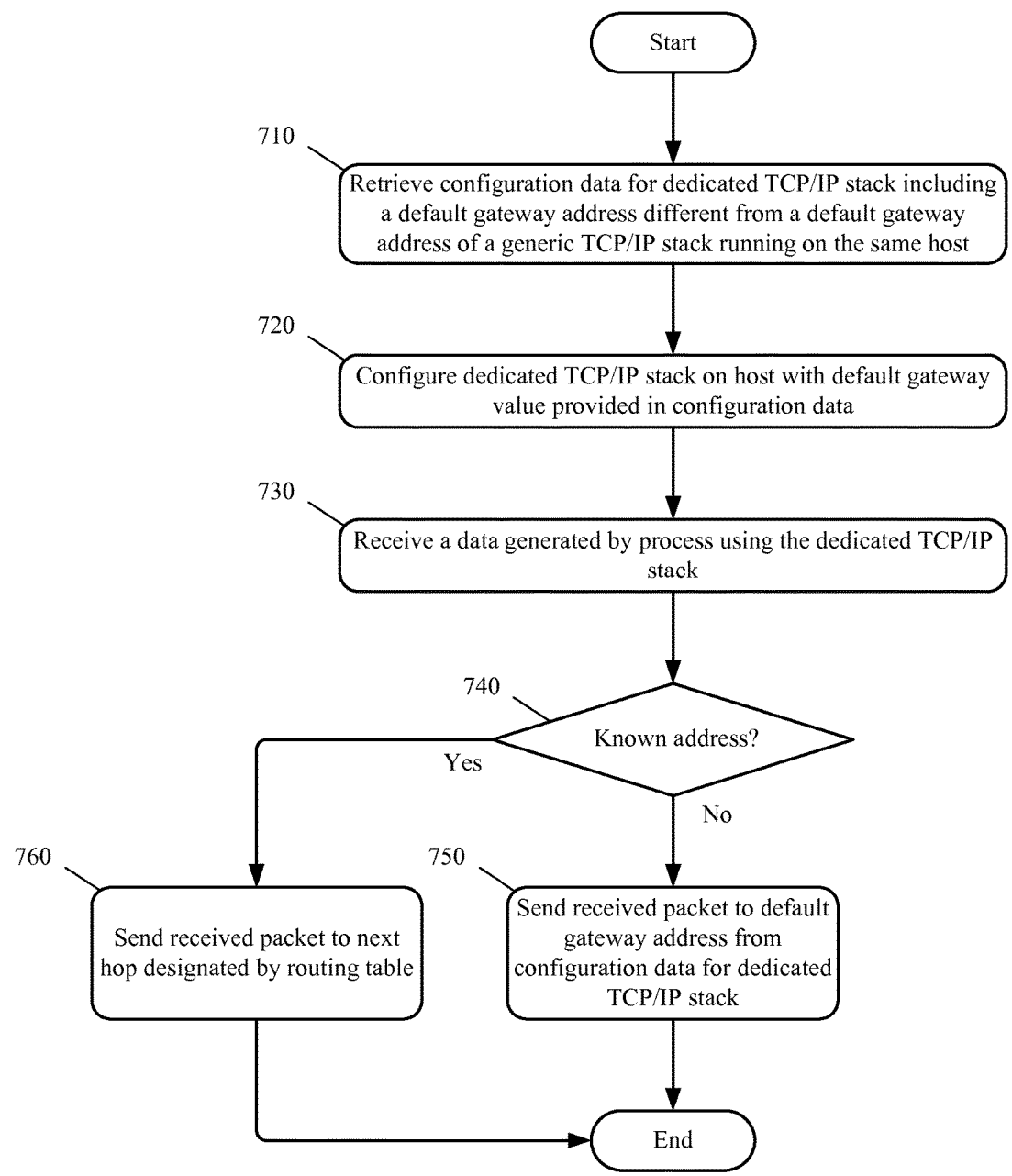
FIG. 7 conceptually illustrates a process of some embodiments for sending packets to a default gateway of a TCP/IP stack processor.

Once a process has been assigned to a TCP/IP stack processor, the process can begin sending data to the TCP/IP stack processor. The TCP/IP stack processor then processes the data into IP packets and sends the IP packets out through a virtual switch and a pNIC. FIG. 7 conceptually illustrates a process 700 of some embodiments for sending packets to a default gateway of a dedicated TCP/IP stack processor. The process 700 receives (at 710) configuration data for a dedicated TCP/IP stack processor. The configuration data includes a default gateway for the TCP/IP stack processor that is different from the default gateway address of a generic TCP/IP stack processor running on the same host. FIGS. 8-11 illustrate TCP/IP stack processors with different default gateway addresses. For example, the default gateway address for the generic TCP/IP stack processor could be 192.168.3.1, the default gateway address for one dedicated TCP/IP stack processor could be 192.168.2.1, and the default gateway address for another dedicated TCP/IP stack processor could be 10.12.13.14. The process 700 configures (at 720) a dedicated TCP/IP stack processor on the host with the default gateway address. In the first example described above, the process 700 would configure the dedicated TCP/IP stack processor with a default gateway address of 192.168.2.1.

The process 700 then receives (at 730) data, to be converted to IP packets, generated by the process that is assigned to the dedicated TCP/IP stack processor. The process 700 then determines (at 740) whether the destination address of the IP packets to is known (i.e., whether the destination address is found in the routing tables of the dedicated TCP/IP stack processor). When the destination address of the IP packets is not known, then the process 700 sends (at 750) the IP packet to the default gateway address of the dedicated TCP/IP stack processor. When the destination address of the IP packets is known, then the process 700 sends (at 760) the IP packet to the "next hop" address of the dedicated TCP/IP stack processor.

Figure 8:
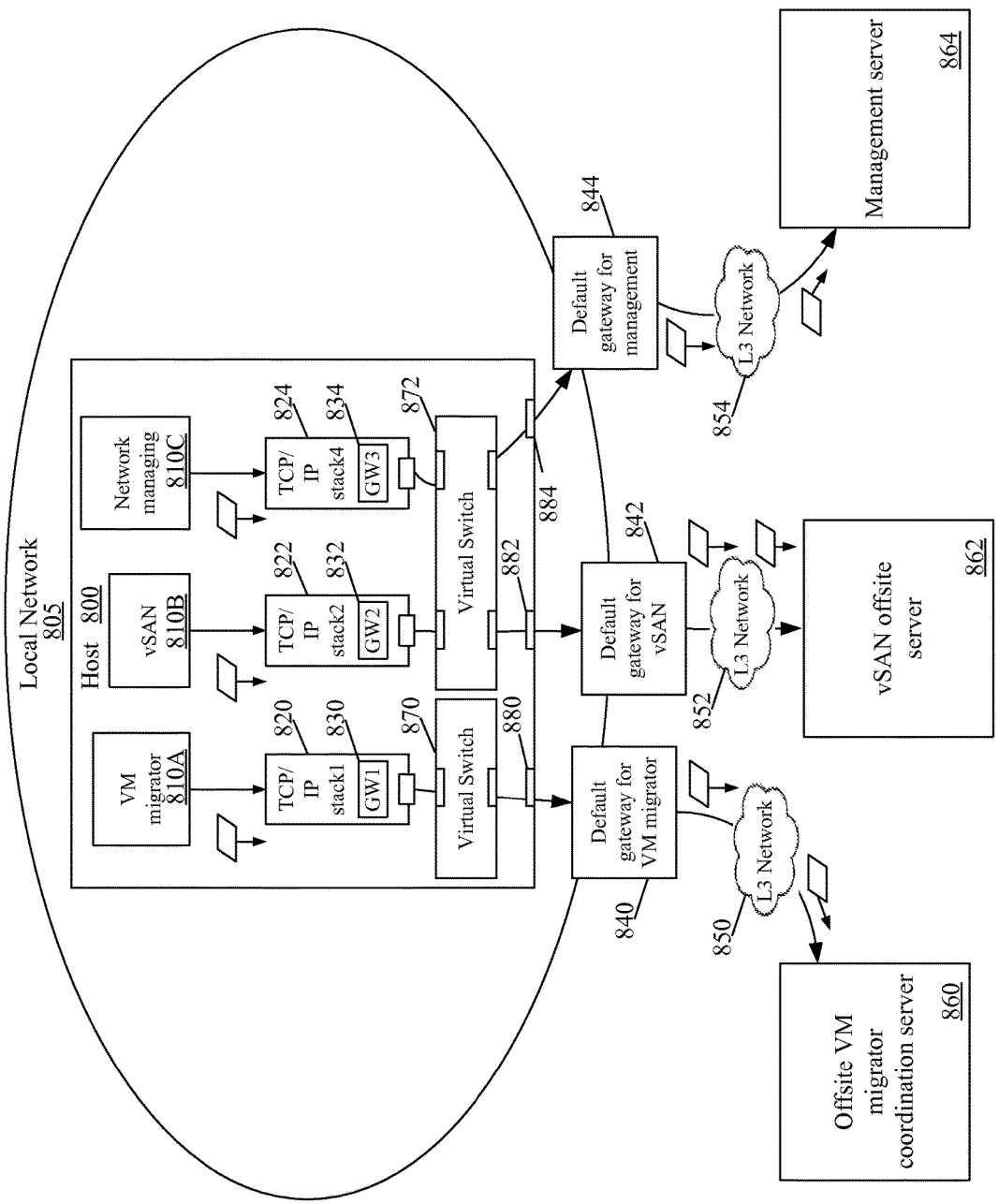
FIG. 8 conceptually illustrates a system with a host implementing multiple TCP/IP stack processors with different default gateways.

FIG. 8 conceptually illustrates a system with a host implementing multiple TCP/IP stack processors with different default gateways. The figure includes host 800 in local network 805, processes 810A-810C, TCP/IP stack processors 820-824 with default gateway addresses 830-834, conceptual default gateways 840-844, L3 networks 850-854, servers 860-864, virtual switches 870 and 872 which send data out through pNICs 880-884.

The host 800 operates as one device on a local network 805 of hosts and other computing devices. In some embodiments, the local network 805 is a multi-tenant datacenter or an enterprise network (e.g., a central network of a company). In some embodiments, the host 800 implements management processes 810A-810C for managing applications and/or virtual machines (not shown) running on the host 800. Process 810A is a virtual machine migration process. In some embodiments, a virtual machine migration process 810A transfers virtual machines from one host (a source host) to another host (a destination host). In some embodiments, the destination host of such a transfer may be on the same local network as the source host. In some embodiments, the destination host of such a transfer might be on a different local network from the source host. In some embodiments, a virtual machine migration process is implemented on both the source host and the destination host.

Process 810B is a virtual storage area network (vSAN) process for providing storage for data stored on virtual drives in the virtual machines. Process 810C is another network managing application (e.g., a network file system (NFS), a fault tolerance application that implements a process for running a backup virtual machine on one host to take over operations if a virtual machine on another host fails, etc.). In the embodiments of FIG. 8, the process 810C uses a generic TCP/IP stack processor, but in other embodiments, the above described processes use dedicated TCP/IP stack processors with their own default gateways.

TCP/IP stack processors 820 and 822 are dedicated TCP/IP stack processors with their own default gateway addresses 830 and 832, respectively. TCP/IP stack processor 824 is a generic TCP/IP stack processor with its own default gateway 834. The TCP/IP stack processors 820-824 send packets out of the host 800 through ports of virtual switches 870 and 872 and then through pNICs 880-884. After the IP packets leave the host 800, the IP packets are sent out of the local network 805 to initial destinations represented by conceptual default gateways 840-844. The IP packets are sent to their respective destinations (servers 860-864) through L3 networks 850-854, and servers 860-864. Although L3 networks 850-854 are shown in FIG. 8 as three separate networks, in some embodiments, IP packets from multiple TCP/IP stack processors are carried on one L3 network to their destinations. L3 or Layer 3, refers to the network layer of the multilayered communication model, Open Systems Interconnection (OSI), which is well known to one of ordinary skill in the art. The network layer operates through network nodes knowing the address of neighboring nodes in the network, selecting routes and quality of service, and recognizing and forwarding to the Transport layer incoming messages for local host domains.

The servers 860-864 are the destinations of the default gateways 830-834. The offsite virtual machine migrator coordination server 860 is the destination of the default gateway 830 for the virtual machine migrator process 810A. Server 860 coordinates the transfer of virtual machines between hosts in the local network and/or hosts in other local networks (not shown in this figure, but see FIG. 10, below). The vSAN offsite server 862 is the destination of default gateway 832 for the vSAN storage process 810B. Server 862 provides virtual storage for virtual machines (not shown) on the host 800. The network management server 864 is the destination of default gateway 834 for the other network management process 810C. Server 864 provides network management operations.

In the embodiments of FIG. 8, each TCP/IP stack processor uses a different pNIC. TCP/IP stack processor 820 uses pNIC 880, TCP/IP stack processor 822 uses pNIC 882, and TCP/IP stack processor 824 uses pNIC 884. In some embodiments, a separate pNIC must be used for each different default gateway address. In such embodiments, two TCP/IP stack processors that use a common pNIC must also use a common default gateway address. However, in some embodiments, multiple TCP/IP stack processors are implemented with a VLAN system. In such a system, the TCP/IP stack processors add a VLAN tag to the packets which allows the packets to use the same pNIC, but be sent to different destinations depending on the VLAN tags. As shown in FIG. 8, in some embodiments, one virtual switch (e.g., virtual switch 872) can connect multiple TCP/IP stack processors (e.g., TCP/IP stack processors 822 and 824) to multiple pNICs (e.g., pNICs 882 and 884). In other embodiments, each pNIC is associated with a single virtual switch.

Figure 9:
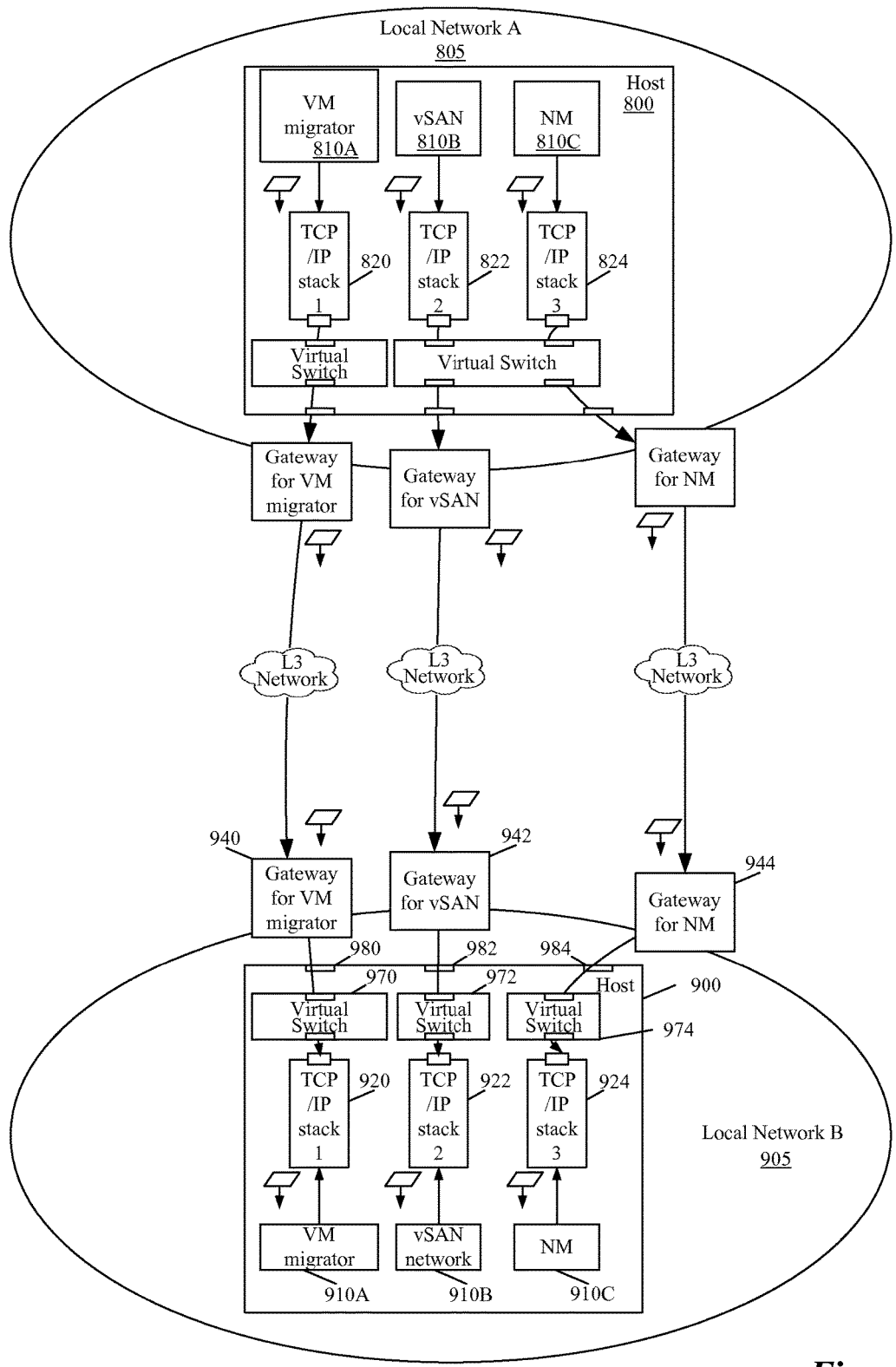
FIG. 9 illustrates multiple TCP/IP stack processors with default gateways sending packets to another local network.

FIG. 8 illustrates an embodiment in which the default gateways lead to independent servers. However, in other embodiments, the default gateways may send packets to other local networks. FIG. 9 illustrates multiple TCP/IP stack processors with default gateways sending packets to another local network. FIG. 9 includes a second host 900 on a second local network 905, processes 910A-910C, TCP/IP stack processors 920-924, conceptual default gateways 940-944, and virtual switches 970-974 which send data out through pNICs 980-984.

At the second local network 905, the packets enter, addressed to the default gateway addresses of the TCP/IP stack processors 820-824 of the host 800 of the first local network 805. The entry of each set of packets to the second local network 905 is represented by conceptual default gateways 940-944. Once the packets reach the host 900, through pNICs 980-984, the pNICs 980-984 send the packets through the virtual switches 970-974. The virtual switches 970-974 send the packets to the TCP/IP stack processors of the host 900 to processes 910A-910C.

The illustrated embodiment includes more virtual switches 970-974 (three virtual switches) than the number of virtual switches 870-872 (two virtual twitches) on the first host 800. However, the number of switches in one host is not necessarily related to the number of switches in the other host, in some embodiments. The receiving host of some embodiments implements fewer virtual switches than the sending host or the same number of virtual switches as the sending host. Similarly, other aspects of the two hosts are the same as an illustration that some embodiments are implemented on local networks with hosts that include similar or identical features. However, this is not a requirement of the invention. As illustrated in FIG. 8, above, in some embodiments, the processes or machines that are the destinations of the default gateways of the dedicated TCP/IP stack processors can be quite different from the processes that originate the data in the IP packets being sent using the default gateway addresses. The embodiment of FIG. 9 shows all three default gateways leading to separate processes on a single host 900 in a single local network 905. However, in some embodiments (e.g., the embodiment of FIG. 8), the default gateways lead to processes on more than one host, to more than one machine, or to more than one local network.

Figure 10:
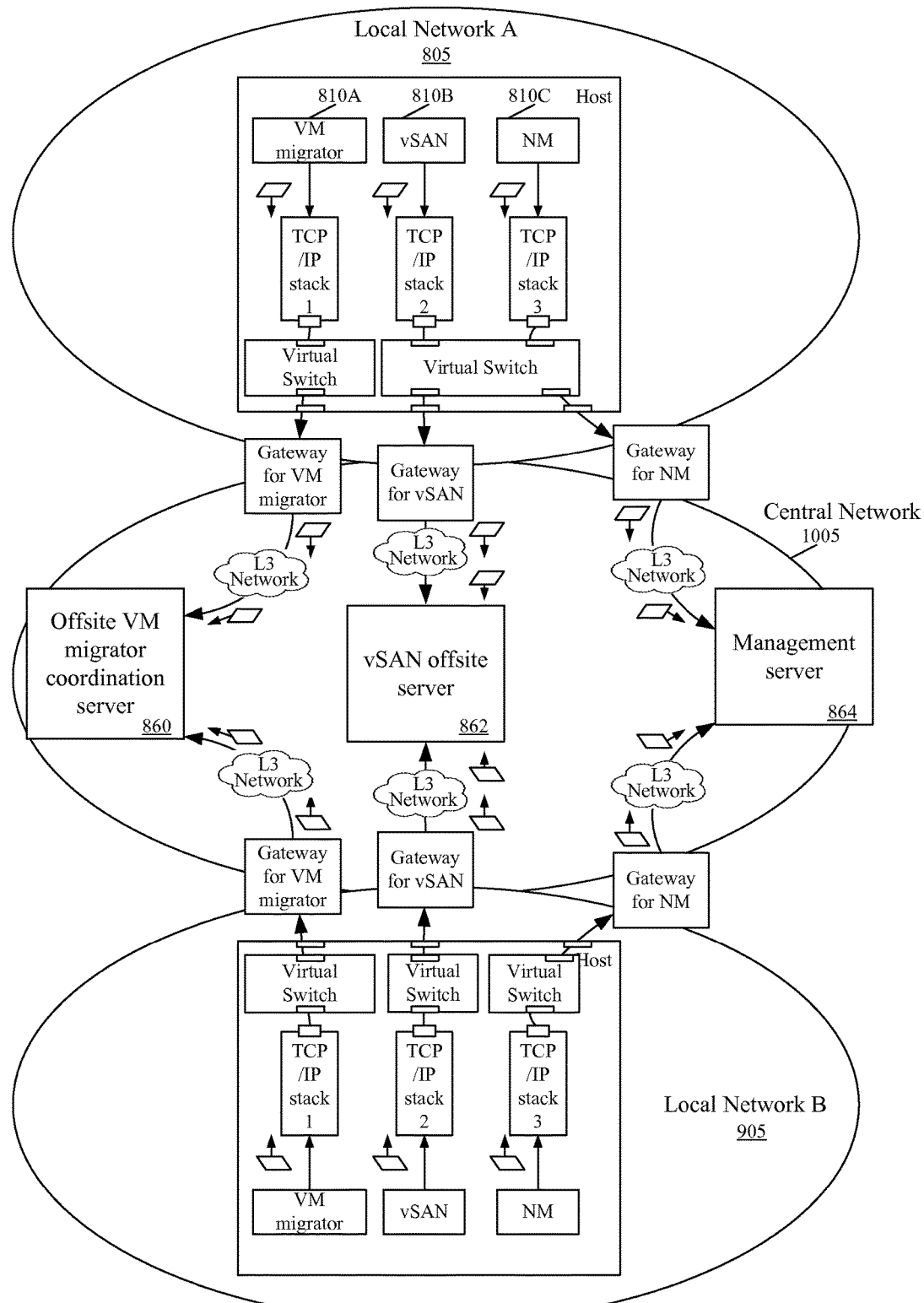
FIG. 10 illustrates a system in which separate default gateways of multiple TCP/IP stack processors implemented on a single host point to a central network that controls processes that use the TCP/IP stack processors.

In some embodiments, the separate default gateway addresses of more than one local network point to one or more central control networks (e.g., as many as one central control network per default gateway). The devices and/or processes of the central control network then implement any required cross-communication between the local networks. FIG. 10 illustrates a system in which separate default gateways of multiple TCP/IP stack processors implemented on a single host point to a central network that controls processes that use the TCP/IP stack processors. In this embodiment, the default gateways of local networks 805 and 905 contain addresses of servers in a central control network 1005. The central control network 1005 includes servers 860-864. The servers 860-864 are the destinations of the default gateways. The offsite virtual machine migrator coordination server 860 is the destination of the default gateway for the virtual machine migrator process 810A. Server 860 coordinates the transfer of virtual machines between hosts in the local network and/or hosts in other local networks (not shown in this figure, but see FIG. 10, below). The vSAN offsite server 862 is the destination of default gateway for the vSAN storage process 810B. Server 862 provides virtual storage for virtual machines (not shown) on the host 800. The network management server 864 is the destination of default gateway for the other network management process 810C.

Some embodiments provide a single management plane for managing all of the hypervisor services vis-a-vis multiple TCP/IP stack processors. In current systems that use static routes as explained earlier to solve the problem of multiple gateways, an entity setting up a datacenter or enterprise network would have to manage (by setting up static routes) the gateway information for each and every hypervisor in a cluster. Having a "single pane of glass" for managing the gateways for all the hypervisors is very useful for the entity operating a datacenter or enterprise network. In some embodiments, as long as the underlying network/DHCP is set up correctly, each hypervisor service picks up any necessary configuration data (e.g., default gateway addresses for the dedicated TCP/IP stack processors) from the underlying network.

III. Common and Separate Resource Pools

TCP/IP stack processors on a host machine are implemented using memory of the host machine. The memory is used to provide sockets and connections for the TCP/IP stack processors and for storage of data in the IP packets and various associated data. The memory and other resources (e.g., connections, sockets, heap space, etc.) used to implement the TCP/IP stack processors of some embodiments are provided in one of two types of system. In some embodiments, the separate TCP/IP stack processors use a common (sometimes called "shared") pool of resources to implement the TCP/IP stack processors. In a shared resource system, resources are allocated from a common pool and each TCP/IP stack processor calls upon the common pool of resources as needed, then releases the resources back into the pool when that TCP/IP stack processor is no longer using them. In other embodiments, the TCP/IP stack processors use separately allocated resources. In such embodiments, each TCP/IP stack processor is allocated a certain set amount of resources and those resources are not usable by other TCP/IP stack processors, even when the TCP/IP stack processor to which the resources are allocated is not using the resources.

Since resources are isolated between stacks, in some embodiments, if one stack runs out of resources (e.g., memory/sockets), it does not affect the applications or processes running on other stacks. So, there is reason to use multiple stacks for different applications even when we do not need multiple gateways. This provides a solution for resource isolation.

A system with a shared resource pool and a system with a common resource pool each have some advantages over the other. Accordingly, different embodiments use different systems depending on which advantages are sought. One advantage of embodiments that allocate separate resources is that no TCP/IP stack processor is deprived of resources. However, in such embodiments, when a TCP/IP stack processor in an embodiment with allocated resources uses up all of its allocated resources, the TCP/IP stack processor cannot call upon the resources of other TCP/IP stack processors, even when those TCP/IP stack processors are not using those resources. This can lead to a disadvantage because resources that would otherwise be useful are idle because the TCP/IP stack processor that needs them cannot access them, while the TCP/IP stack processor that can access them does not need them.

Figure 13:
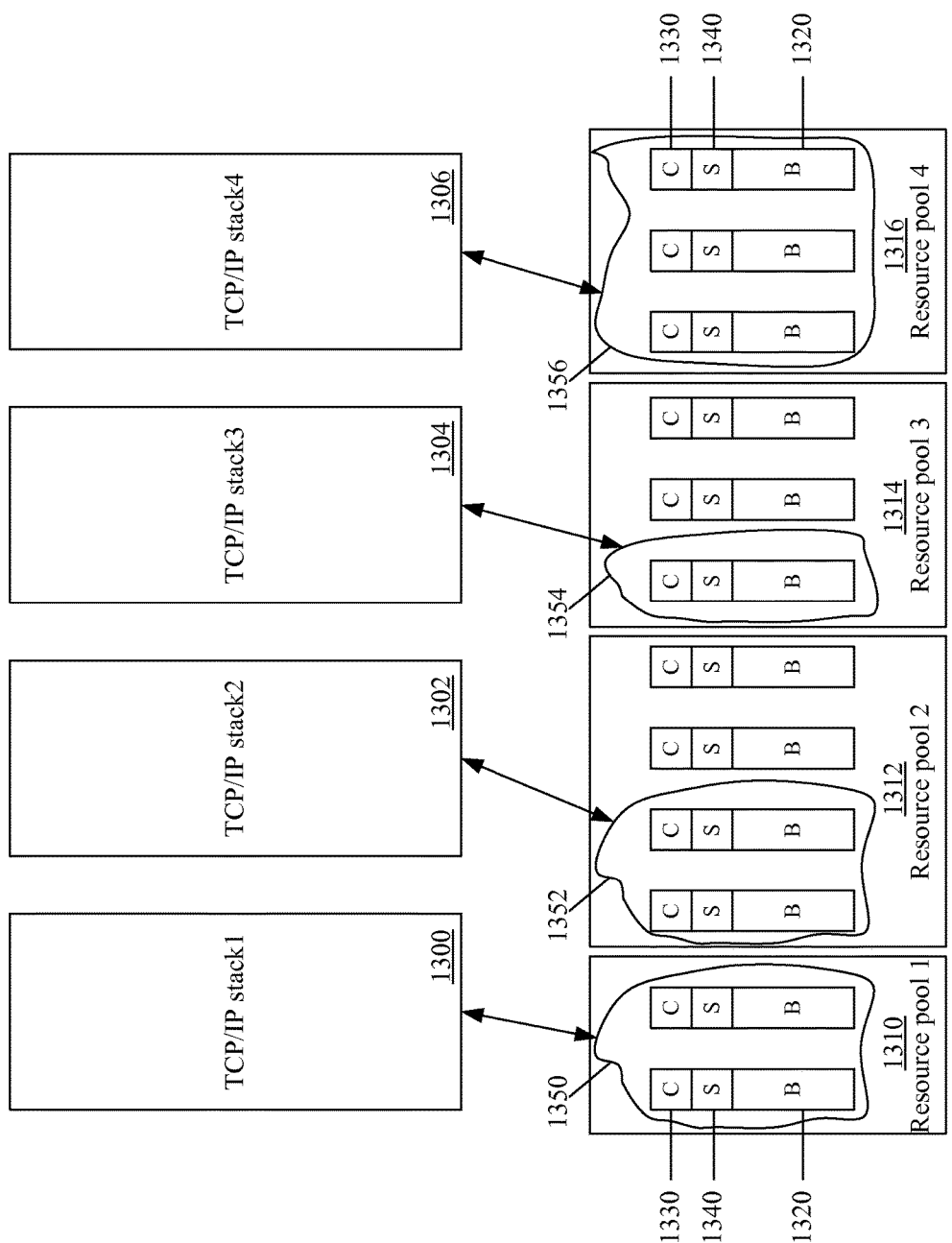
FIG. 13 conceptually illustrates multiple TCP/IP stack processors of some embodiments using separately allocated resources.

In contrast, one advantage to embodiments with a common pool of resources is that resources are not left idle while a TCP/IP stack processor needs them. However, in such embodiments, it is possible for one or more TCP/IP stack processors to exhaust the resources of the common resource pool. That is, one or more TCP/IP stack processors use all the resources (or too large a share of the resources), leaving no resources (or inadequate resources) available for another TCP/IP stack processor. The two embodiments are illustrated in FIGS. 11 and 13, described below.

Figure 11:
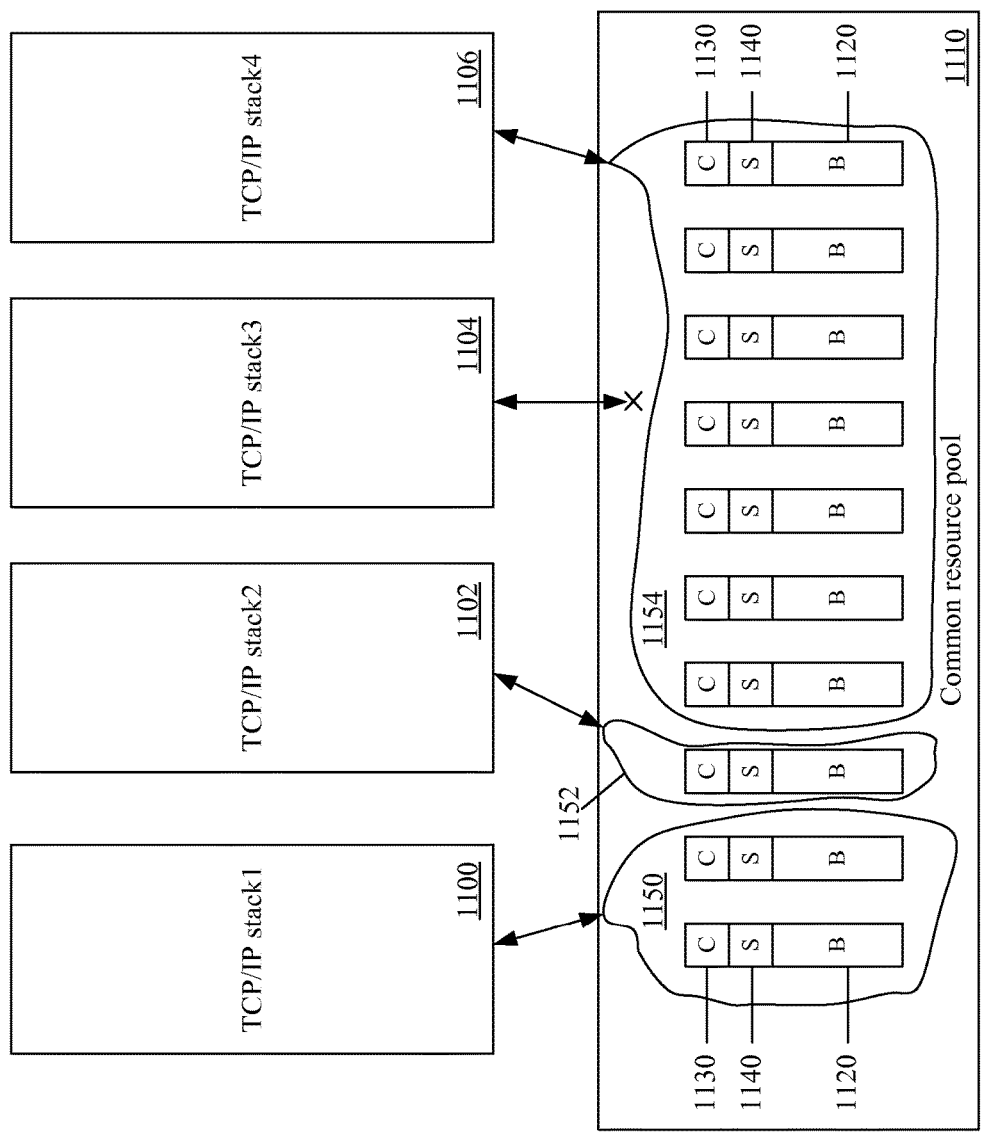
FIG. 11 conceptually illustrates multiple TCP/IP stack processors of some embodiments using a common resource pool.

FIG. 11 conceptually illustrates multiple TCP/IP stack processors of some embodiments using a common resource pool. The figure includes multiple TCP/IP stack processors 1100-1106 and a common resource pool 1110 with memory blocks 1120, connections 1130 and sockets 1140 in resource groups 1150-1154.

The TCP/IP stack processors 1100-1106 are multiple TCP/IP stack processors implemented on a single host (not shown). The host has limited amounts of memory. The memory on the host is allocated for the various operations and processes implemented by the host machine. The memory allocated for use by the various TCP/IP stack processors is conceptually illustrated by the memory blocks 1120 in common resource pool 1110. The TCP/IP stack processors use the allocated memory to implement connections 1130 and sockets 1140 for those connections in order to send and receive IP packets. The resource groups 1150-1154 show which resources are in use by TCP/IP stack processors 1100, 1102, and 1106 (e.g., the resources surrounded by the boundary of each resource group are the resources in use by the TCP/IP stack processor connected to the resource group by a double headed arrow).

As shown in the figure, three of the four TCP/IP stack processors, TCP/IP stack processors 1100, 1102, and 1106 are each using blocks of memory, sockets, and connections, in resource groups 1150-1154. TCP/IP stack processor 1100 is using the two memory blocks 1120 of resource group 1150 and the connections 1130 and sockets 1140 of resource group 1150 implemented with the memory blocks 1120 of resource group 1150. TCP/IP stack processor 1102 is using the two memory blocks 1120 of resource group 1152 and the associated connections 1130 and sockets 1140 of resource group 1152. Similarly, TCP/IP stack processor 1106 is using the two memory blocks 1120 of resource group 1154 and the associated connections 1130 and sockets 1140 of resource group 1154.

This figure illustrates both an advantage and a disadvantage of a common resource pool embodiment. An advantage to the illustrated embodiment is that none of the resources in the common resource pool 1110 are wasted. In this example, all resources are used by one TCP/IP stack processor or another. A disadvantage of the illustrated embodiment is that there are no resources available to TCP/IP stack processor 1104 (as indicated by the "x" below TCP/IP stack processor 1104) because TCP/IP stack processor 1106 is using so many resources and the rest of the resources are used by TCP/IP stack processors 1100 and 1102.

Figure 12:
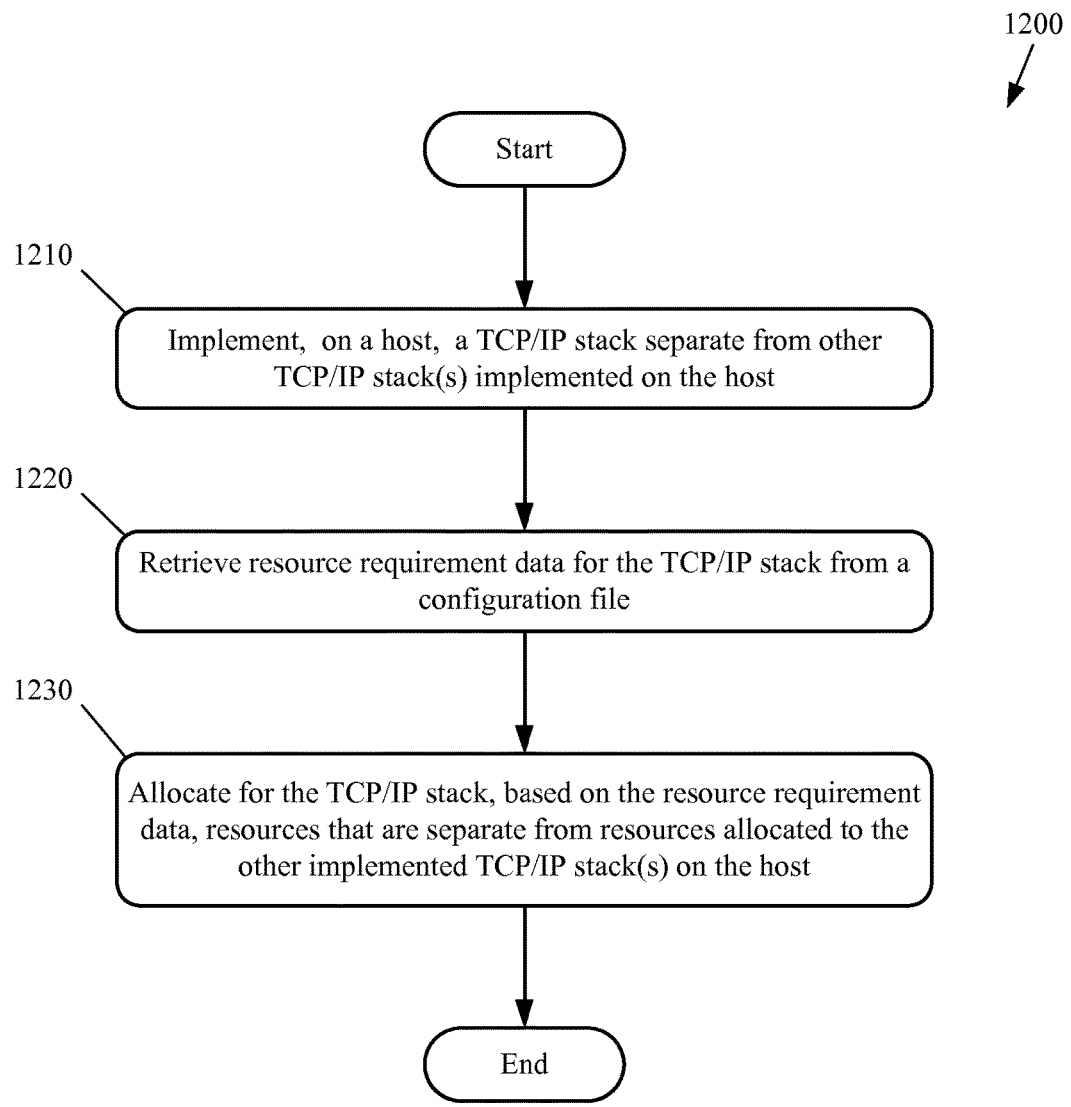
FIG. 12 conceptually illustrates a process of some embodiments for separately allocating resources to separate TCP/IP stack processors.

Some embodiments separately allocate resources to different TCP/IP stack processors on a host. FIG. 12 conceptually illustrates a process 1200 of some embodiments for separately allocating resources to separate TCP/IP stack processors. The process 1200 implements (at 1210) on a host a TCP/IP stack processor separate from other TCP/IP stack processors implemented on the host. The implemented TCP/IP stack processor can be a stack for a single process or application on the host or for a group of processes and/or applications on the host. The process 1200 then retrieves (at 1220) resource requirement data for the TCP/IP stack processor from a configuration file. In some embodiments, the resource requirement data includes a maximum and a minimum requirement level for resources (e.g., the TCP/IP stack processor should be allocated at least the minimum required memory, but no more than the maximum required memory, even if more memory is available). In some embodiments, the resource requirement data includes a configuration setting that indirectly determines the resources allocated to the TCP/IP stack processor, such as a priority setting that identifies how important that TCP/IP stack processor is. In such embodiments, the requirement levels for other implemented and/or unimplemented TCP/IP stack processors affect the resources allocated (e.g., the most important implemented TCP/IP stack processor gets the largest share of memory).

The process 1200 then allocates (at 1230), based on the configuration data, resources to the TCP/IP stack processor that are separate from the resources allocated to other TCP/IP stack processors. In some embodiments, when the resources are allocated, the resources may be taken from resources previously allocated to other TCP/IP stack processors. However, after the allocation of the resources, the resources allocated to each TCP/IP stack processor will be separate.

FIG. 13 conceptually illustrates multiple TCP/IP stack processors of some embodiments using separately allocated resources. The figure includes multiple TCP/IP stack processors 1300-1306 and separate resource pools 1310-1316. The resource pools include memory blocks 1320, connections 1330 and sockets 1340. In each resource pool 1310-1316, some or all of the resources are in use as indicated by resource groups 1350-1356.

The TCP/IP stack processors 1300-1306 are multiple TCP/IP stack processors implemented on a single host (not shown). The host has limited amounts of memory. The memory on the host is allocated for the various operations and processes implemented by the host machine. The memory allocated for use by the various TCP/IP stack processors is conceptually illustrated by the memory blocks 1320 in the separate resource pools 1310-1316. The TCP/IP stack processors 1300-1306 use the allocated memory to implement connections 1330 and sockets 1340 for those connections in order to send and receive IP packets. The resource groups 1350-1356 show which resources are in use by TCP/IP stack processors 1300-1306 (e.g., the resources surrounded by the boundary of each resource group are the resources in use by the TCP/IP stack processor connected to that resource group by a double headed arrow).

The different TCP/IP stack processors 1300-1306 of the figure have different amounts of resources allocated to them. As shown in the figure, TCP/IP stack processors 1300-1306 each have separate memory pools with blocks of memory, sockets, and connections. Each TCP/IP stack processor is using part or all of its allocated memory pool. TCP/IP stack processor 1300 has a resource pool 1310 with two memory blocks 1320. In this example, both memory blocks 1320 of resource pool 1310, and the connections 1330 and sockets 1340 implemented with the memory blocks 1320, are in use by TCP/IP stack processor 1300, as indicated by their inclusion in resource group 1350. TCP/IP stack processor 1302 has a resource pool 1312 with four memory blocks 1320. In this example, two of the four memory blocks 1320 of resource pool 1312, and the connections 1330 and sockets 1340 implemented with those two memory blocks 1320, are in use by TCP/IP stack processor 1302, as indicated by their inclusion in resource group 1352. TCP/IP stack processor 1304 has a resource pool 1314 with three memory blocks 1320. In this example, one of the three memory blocks 1320 of resource pool 1314, and the connections 1330 and sockets 1340 implemented with that memory block 1320, are in use by TCP/IP stack processor 1304, as indicated by its inclusion in resource group 1354. TCP/IP stack processor 1306 has a resource pool 1316 with three memory blocks 1320. In this example, all three of the memory blocks 1320 of resource pool 1316, and the connections 1330 and sockets 1340 implemented with that memory block 1320, are in use by TCP/IP stack processor 1306, as indicated by their inclusion in resource group 1356.

This figure illustrates both an advantage and a disadvantage of a separate allocated resource pool embodiment. A disadvantage to the illustrated embodiment is that some of the resources in the separate resource pools 1310-1316 may be wasted. In this example, TCP/IP stack processors 1300 and 1306 are using all the resources in their allocated resource pools 1310 and 1316, respectively. In contrast, TCP/IP stack processors 1302 and 1304 have unused resources in their allocated resource pools 1312 and 1314, respectively. TCP/IP stack processors 1300 and 1306 are unable to use the unused resources of TCP/IP stack processors 1302 and 1304, so those resources are wasted in the present example. However, unlike the embodiment of FIG. 11, in the embodiment of FIG. 13, all of the TCP/IP stack processors 1300-1306 have access to resources without one or more of the TCP/IP stack processors 1300-1306 using up all available resources and leaving another TCP/IP stack processor with no resources.

IV. Separate TCP/IP Stack Processors for Each Tenant

In some embodiments, multiple TCP/IP stack processors provide vertical isolation between data flows of different types. In some embodiments, the hypervisor dedicates one set of stacks per tenant. This extends isolation between flows all the way up into the hypervisor.

On a multi-tenant datacenter, various processes are implemented separately for each tenant. Other processes are implemented separately for each virtual machine on a host of a datacenter (e.g., a mouse, keyboard, screen (MKS) process). In order to reduce the chance that packets intended for one tenant will be accidentally sent to another tenant, some embodiments implement a separate TCP/IP stack processor on a host for each tenant with a process operating on that host. Similarly, in some embodiments a single tenant may include multiple owners of processes (e.g., each department of a company owns its own processes). In such embodiments, the separate TCP/IP stack processors can be implemented for each owner rather than for each tenant. In the below described embodiments, when a reference is made to separate tenants, some embodiments of the invention function in the same manner, but with separate owners that are part of the same tenant in a system with either a single tenant or multiple tenants.

Figure 14:
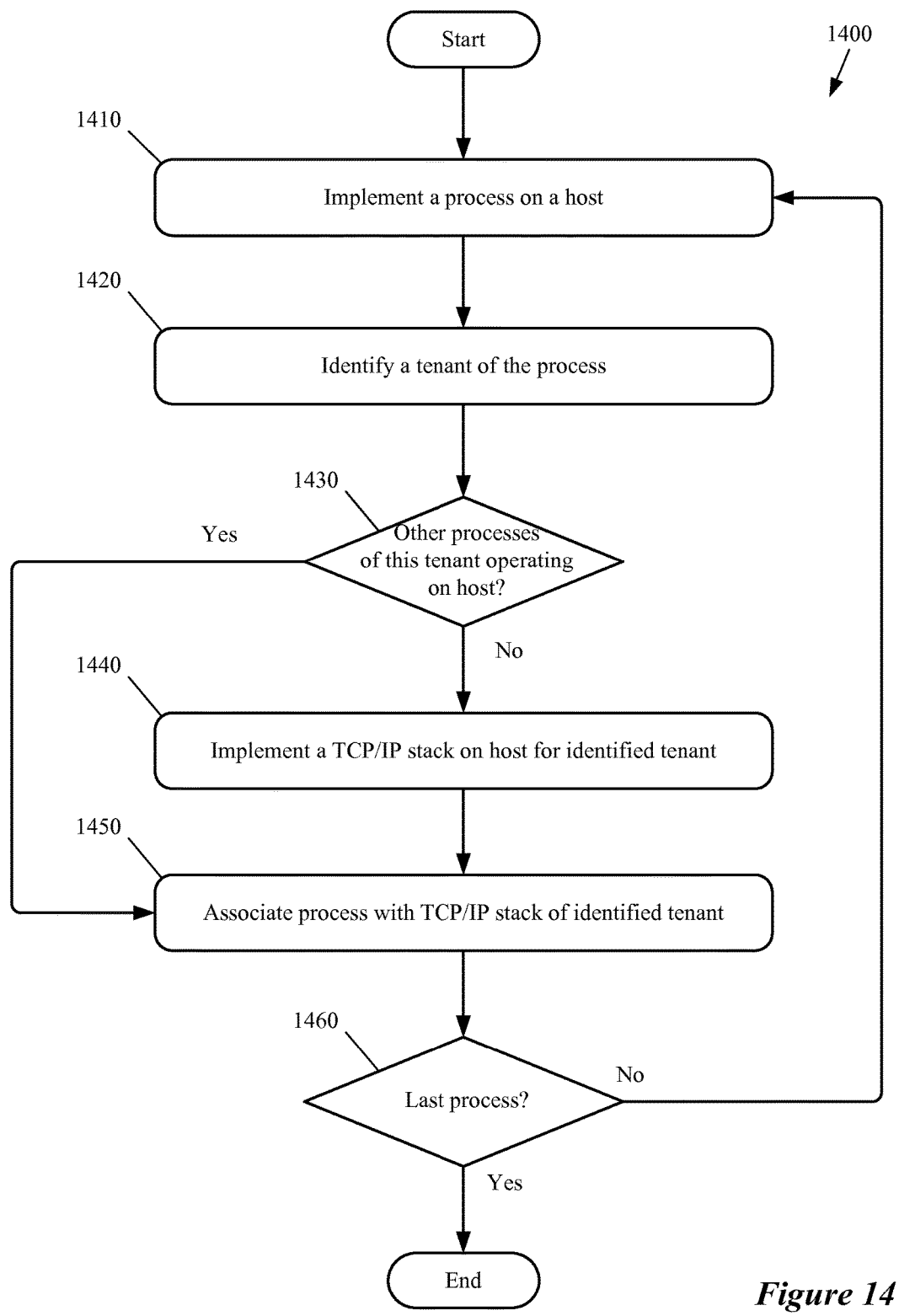
FIG. 14 conceptually illustrates a process of some embodiments for setting up TCP/IP stack processors for separate tenants on a multi-tenant system.

FIG. 14 conceptually illustrates a process 1400 of some embodiments for setting up TCP/IP stack processors for separate tenants on a multi-tenant system. The process 1400 implements (at 1410) a process on a host. The process (e.g., an MKS process) in some embodiments is implemented in a user space of the host. In some embodiments, the process is implemented in a kernel space on a host (e.g., a virtual machine migration process). The process 1400 then identifies a tenant of the implemented process (e.g., a particular tenant on a host of a multi-tenant datacenter, an owner that is a department of a single tenant enterprise network, etc.).

The process 1400 determines (at 1430) whether other processes of the same tenants are operating on the host. In the previously described figures, the TCP/IP stack processors were implemented at the boot up time of the host machines in some embodiments. Implementing all such TCP/IP stack processors at boot up time is practical because only a limited number of processes are implemented that use a dedicated TCP/IP stack processor rather than a generic TCP/IP stack processor. Additionally, the processes that use dedicated TCP/IP stack processors in some embodiment are processes that are consistently implemented on the host each time the host is booted up. In contrast, for a multi-tenant datacenter (or multi-owner enterprise network), the system does not necessarily know in advance which tenants will have their processes (e.g., processes to support virtual machines of that tenants) implemented on a particular host. Accordingly, some embodiments that provide separate TCP/IP stack processors for separate tenants implement the TCP/IP stack processors for the tenants only when a process belonging to that tenants is implemented on a particular host.

In embodiments that implement single tenants TCP/IP stack processors only when a process owned by a particular tenants is running on the host, there will not already be a TCP/IP stack processor implemented on the host for the tenants that the newly implemented process belongs to. Therefore, the process 1400 implements (at 1440) a TCP/IP stack processor on the host for that tenants then moves on to operation 1450. When there is another process on the host from the tenants of the implemented process, there will already be a TCP/IP stack processor implemented on the host for that tenants. Therefore, the process 1400 skips operation 1440 and associates (at 1450) the implemented process with the TCP/IP stack processor of the identified tenants.

The process 1400 then determines whether the implemented process was the last process to be implemented. When the implemented process was the last process to be implemented, the process 1400 ends. When the implemented process was not the last process to be implemented, the process 1400 returns to operation 1410 to implement a new process.

Figure 15:
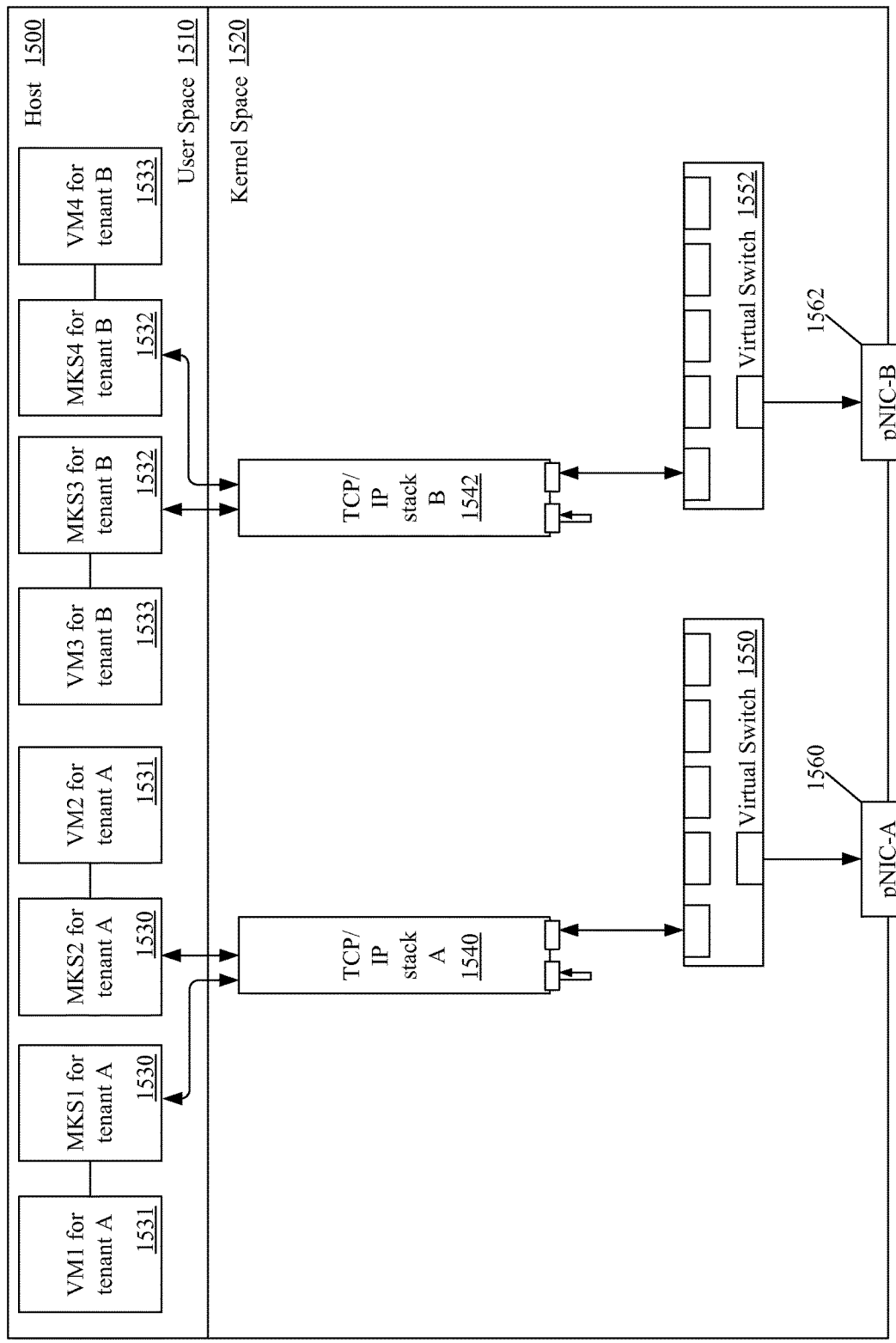
FIG. 15 illustrates a system that separates user space processes by tenant. The system separates user space processes by providing a separate TCP/IP stack processor for each tenant.

FIG. 15 illustrates a system that separates user space processes by tenants. The system separates user space processes by providing a separate TCP/IP stack processor for each tenants. The figure includes a host 1500 implementing processes in a user space 1510 and a kernel space 1520. In the user space 1510, the host 1500 runs mouse, keyboard, screen (MKS) processes 1530 and virtual machines 1531 for tenant A and MKS processes 1532 and virtual machines 1533 for tenant B. In the kernel space 1520, the host 1500 implements TCP/IP stack processor 1540 for tenant A and TCP/IP stack processor 1542 for tenant B. The TCP/IP stack processor 1540 communicatively connects to a virtual switch 1550. The TCP/IP stack processor 1542 connects to a virtual switch 1552. The virtual switch 1550 connects to pNIC 1560. The virtual switch 1552 connects to pNIC 1562.

In some embodiments, the host 1500 is a host machine on a multi-tenant datacenter in which separate owners could be separate tenants, different departments of a single organization, or some other divided categories of owners etc. In other embodiments, the host 1500 is a host on a single tenant enterprise network and separate owners are different departments of a single organization, or some other divided categories of owners. The processes running on the host are run in a user space 1510 or a kernel space 1520. The user space 1510 and kernel space 1510 processes use different APIs of the spaces to operate.

In the user space 1510, the host 1500 runs MKS processes 1530 for tenant A and MKS processes 1532 for tenant B. Some embodiments provide remote access to the virtual machines 1531 and 1533. This remote access allows a user at a different location than the host 1500 to see visual output of one of the virtual machines on a screen of the user's local computer, rather than a screen directly connected to the host 1500. The remote access also allows a user to provide input to the same virtual machines using a mouse and keyboard of the user's local machine rather than a keyboard and mouse connected to the host 1500. In such embodiments, the virtual machine (e.g., one of virtual machines 1531 or 1533) outputs visual data as if the virtual machine were a real machine connected directly to a screen. The visual data is intercepted by the MKS process 1530 or 1532 of the particular virtual machine. The MKS process then sends the visual data over a network to be displayed on the user's local screen. Similarly, the virtual machine (e.g., one of virtual machines 1531 or 1533) receives mouse and keyboard inputs as if the virtual machine were a real machine connected directly to a mouse and keyboard. The mouse and keyboard inputs are passed to the virtual machine by the MKS process 1530 or 1532 of the particular virtual machine after the MKS process receives the mouse and keyboard inputs over the network from the user's local mouse and keyboard.

The MKS processes 1530 and 1532 provide interfaces between virtual machines 1531 and 1533, respectively, running in the user space 1510 of the host 1500 and external mice, keyboards, and screens (e.g., on other computers across the Internet). In order to provide long distance mouse, keyboard, and screen operations, the MKS processes 1530 and 1532 need to communicate with machines outside the host. The MKS processes 1530 use the TCP/IP stack processor 1540 to communicate with the outside machines. The MKS processes 1530 are both MKS processes for virtual machines 1531 of tenant A. The MKS processes 1532 are both MKS processes for virtual machines 1533 of tenant B.

In order to reduce the chance that a bug or crashing process will connect an MKS process 1530 of tenant A (and thus data about a virtual machine 1531 of tenant A) to someone accessing a virtual machine 1533 of tenant B (or connect an MKS process 1532 of tenant B to someone accessing a virtual machine 1531 of tenant A), the illustrated embodiment provides a TCP/IP stack processor 1540 for MKS processes 1530 of tenant A and a separate TCP/IP stack processor 1542 for MKS processes 1532 of tenant B. The TCP/IP stack processor 1540 generates IP packets for the MKS processes 1530 and sends those packets to the virtual switch 1550. The virtual switch 1550 then sends the packets out of the host 1500 through pNIC 1560. Similarly, the TCP/IP stack processor 1542 generates IP packets for the MKS processes 1530 and sends those packets to the virtual switch 1550, which sends the packets out of the host 1500 through pNIC 1562. The separate TCP/IP stack processors 1540 and 1542 also provide an advantage for packets coming from outside and addressed to MKS processes 1530 and 1532 of virtual machines 1531 and 1533 on the host 1500. The inbound packets are also parsed by the separate TCP/IP stack processors, which provides protection against mouse commands or keyboard signals being sent to MKS processes of virtual machines of the wrong tenant (e.g., commands intended for virtual machine 1531 being sent to an MKS process 1532 of virtual machines 1533).

Figure 16:
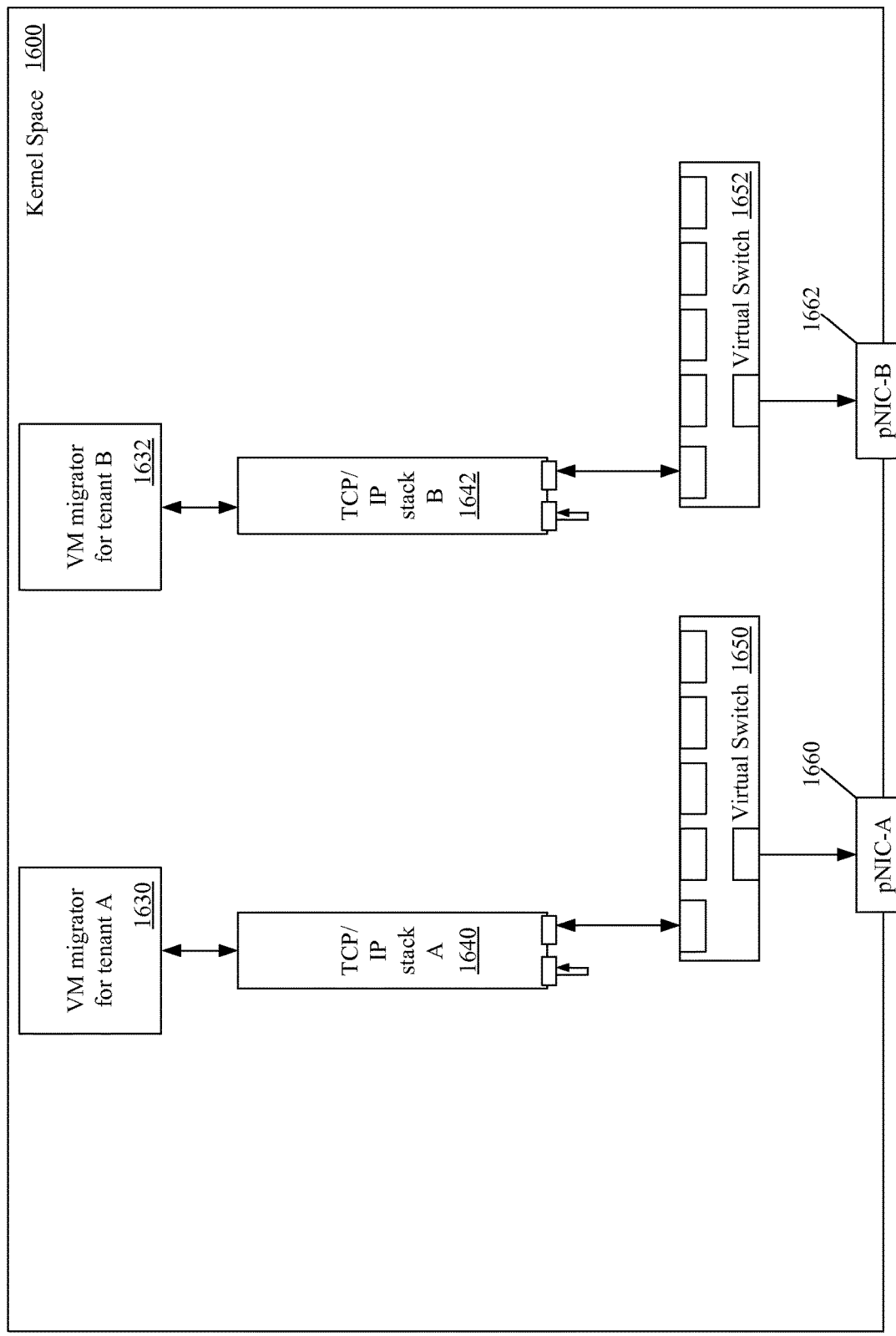
FIG. 16 illustrates a system that separates kernel space processes by tenant and assigns a separate TCP/IP stack processor for each tenant.

FIG. 16 illustrates a system that separates kernel space processes by tenant and assigns a separate TCP/IP stack processor for each tenant. The system separates processes by tenant (e.g., each tenant has its own virtual machine migration process). The figure includes a kernel space 1600. In the kernel space 1600, the host (not shown) runs virtual machine migrator process 1630 for tenant A and virtual machine migrator process 1632 for tenant B. The host also implements TCP/IP stack processor 1640 for tenant A and TCP/IP stack processor 1642 for tenant B in the kernel space 1600. The TCP/IP stack processor 1640 communicatively connects to a virtual switch 1650. The TCP/IP stack processor 1642 connects to a virtual switch 1652. The virtual switch 1650 connects to pNIC 1660. The virtual switch 1652 connects to pNIC 1662.

In some embodiments, instead of or in addition to separate tenants, separate owners are separate departments of one tenant (or some other divided categories of owners) on a multi-tenant datacenter or on a single tenant enterprise network. In the kernel space 1600, a host runs virtual machine migrator process 1630 for tenant A and virtual machine migrator process 1632 for tenant B. The virtual machine migrator process 1630 controls migration of virtual machines of tenant A (not shown) from one host to another host (e.g., another host on a local network or across an L3 network). Similarly, the virtual machine migrator process 1632 controls migration of virtual machines of tenant B (not shown) from one host to another host (e.g., another host on a local network or across an L3 network).

The virtual machine migrator processes 1630 and 1632 need to communicate with external machines in order to send and receive data for implementing virtual machines from one host to another host. Therefore, the virtual machine migrator process 1630 uses the TCP/IP stack processor 1640 to communicate with processes on other hosts. The virtual machine migrator process 1630, in this embodiment, only controls the migration of the virtual machines of tenant A. The virtual machine migrator process 1632, in this embodiment, only controls the migration of the virtual machines of tenant B.

In order to reduce the chance that a bug or crashing process will send data relating to a virtual machine to the wrong tenant, the illustrated embodiment provides a TCP/IP stack processor 1640 for virtual machine migrator process 1630 of tenant A and a separate TCP/IP stack processor 1642 for virtual machine migrator process 1632 of tenant B. The TCP/IP stack processor 1640 generates IP packets for the virtual machine migrator process 1630 and sends those packets to the virtual switch 1650. The virtual switch 1650 then sends the packets out of the host 1600 through pNIC 1660. Similarly, the TCP/IP stack processor 1642 generates IP packets for the virtual machine migrator process 1630 and sends those packets to the virtual switch 1650, which sends the packets out of the host 1600 through pNIC 1662. The separate TCP/IP stack processors 1640 and 1642 also provide an advantage for packets coming from outside. The inbound packets are also parsed by the separate TCP/IP stack processors, which provide protection against virtual machine data reaching the wrong tenant.

V. Separate Loopback Interfaces

As mentioned above, each TCP/IP stack processor can have its own set of interfaces, including its own loopback interface. Isolating the set of interfaces can be useful in a multi-tenant environment for the following reasons. First, some embodiments run a set of canned applications on the hypervisor that are programmed to use the same IP address. In some embodiments, the canned applications use different TCP/IP stack processors. Since the interfaces are isolated from each other, two interfaces can use the same address on different stacks. As long as they are isolated in the underlying network fabric, canned applications can use default IP addresses. This is true for the loopback interface as well. In some embodiments, the loopback interface is not really backed up by an underlying network, but is entirely local to the stack. So, some embodiments run multiple canned applications of the same type (each using a different TCP/IP stack processor) that use the same IP address and TCP port numbers without interfering with each other. Furthermore, some embodiments run multiple sets of canned applications of the same types (each set using a different TCP/IP stack processor) that use the same IP addresses and TCP port numbers without interfering with each other.

Figure 17:
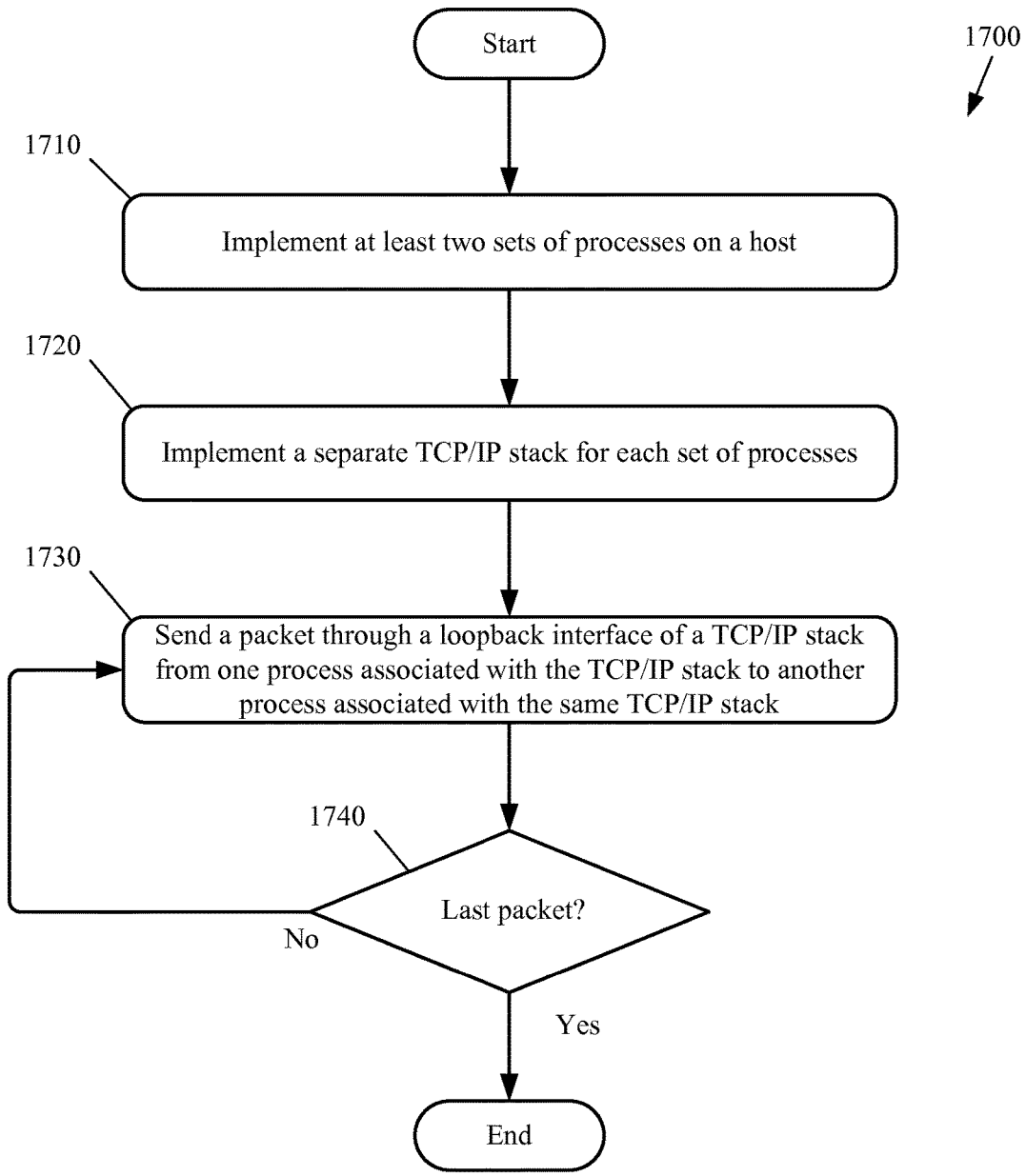
FIG. 17 conceptually illustrates a process of some embodiments for using separate loopback interfaces of separate TCP/IP stack processors for separate sets of processes.
Figure 18:
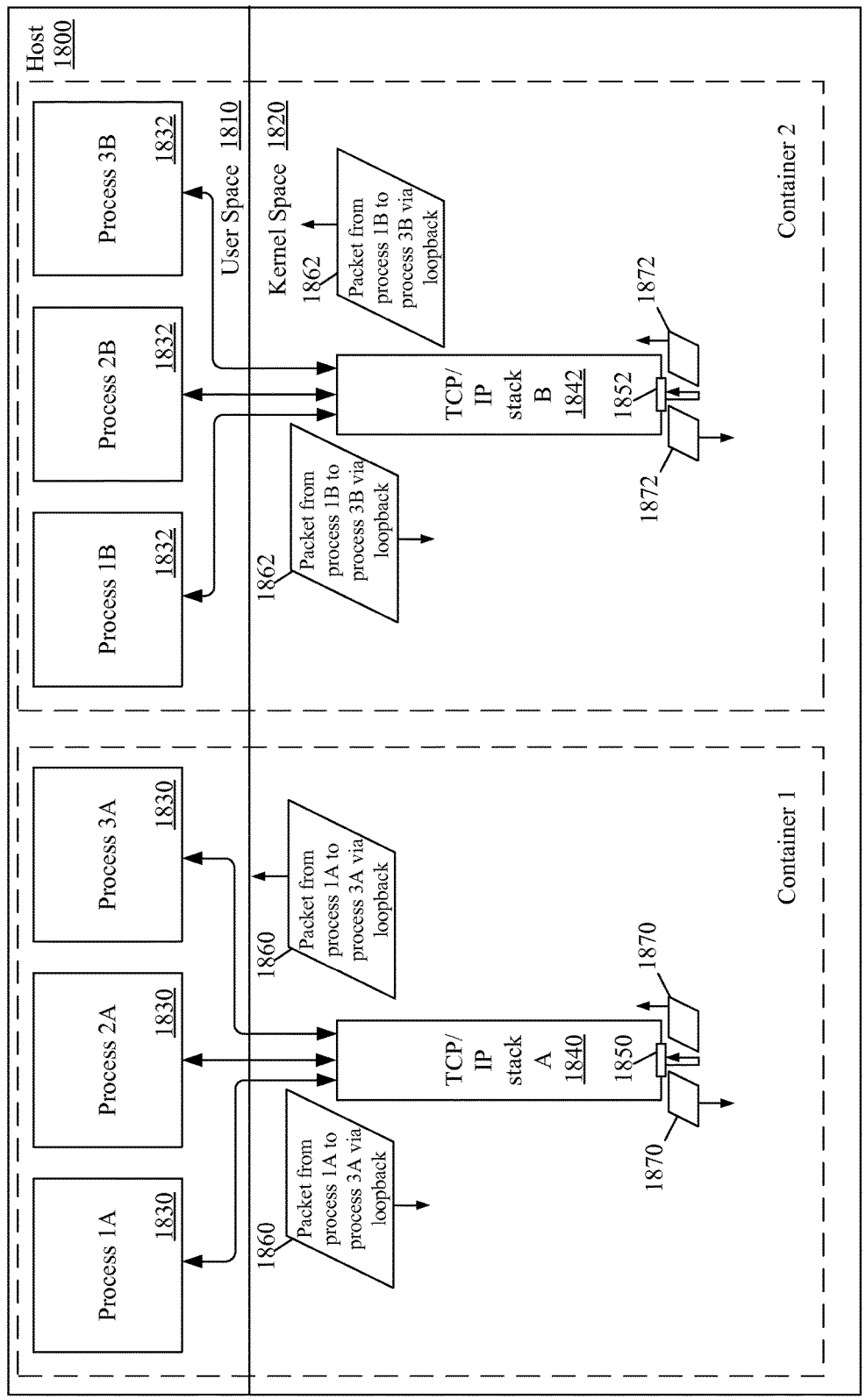
FIG. 18 illustrates a system of some embodiments that provides multiple TCP/IP stack processors with loopback interfaces for multiple sets of processes.

FIG. 17 conceptually illustrates a process of some embodiments for using separate loopback interfaces of separate TCP/IP stack processors for separate sets of processes. The process 1700 implements (at 1710) at least two sets of processes on a host. In some embodiments, each set of processes includes implementations of the same processes as each other set (e.g., each set includes instantiations of processes 1, 2, and 3, as shown in FIG. 18). In some embodiments, some or all sets of processes include one or more different processes from the others (e.g., one set includes instantiations of processes 1, 2, and 3, while another set includes instantiations of processes 4, 5, and 6, or 1, 2, and 6, etc.).

The process 1700 of some embodiments then implements (at 1720) a separate TCP/IP stack processor for each set of processes. The implemented TCP/IP stack processors each include a loopback interface that allows the processes of the set of processes associated with that TCP/IP stack processor to communicate with each other through IP packets generated by the TCP/IP stack processor and sent to itself using the loopback interface. In some embodiments, one or more of the TCP/IP stack processors also provide connections to virtual switches and/or pNICs to send data to processes and/or machines outside the set of processes of the particular TCP/IP stack processor. In contrast, in some embodiments, some or all of the TCP/IP stack processors implemented for the sets of processes may lack connections to send IP packets to any process or machine outside of the TCP/IP stack processor itself and the set of processes associated with the TCP/IP stack processor (see, e.g., the TCP/IP stack processors of FIG. 18).

The process 1700 then sends (at 1730) a data packet through a loopback interface of a TCP/IP stack processor from one process of the set associated with that TCP/IP stack processor, to another process of the set associated with that TCP/IP stack processor. In some embodiments, the loopback interface and the packets are used to test interactions between processes before implementing the processes to send data outside of the set of processes associated with a particular TCP/IP stack processor. The process 1700 then determines (at 1740) whether the packet sent through the loopback was the last packet that needed to be sent. When the packet was the last packet that needed to be sent, the process 1700 ends. When the packet was not the last packet that needed to be sent, the process 1700 returns to operation 1730 and sends another packet through a loopback interface of a TCP/IP stack processor.

FIG. 18 illustrates a system of some embodiments that provides multiple TCP/IP stack processors with loopback interfaces for multiple sets of processes. The system separates sets of user space processes by providing a separate TCP/IP stack processor for each set, conceptually dividing each set of processes and their associated TCP/IP stack processor into separate containers. The figure includes a host 1800 implementing processes in a user space 1810 and a kernel space 1820. In the user space 1810, the host 1800 runs two sets of processes 1830 and 1832. In the kernel space 1820, the host 1800 implements TCP/IP stack processor 1840 for set of processes 1830 and TCP/IP stack processor 1842 for set of processes 1832. The TCP/IP stack processor 1840 includes a loopback interface 1850. The TCP/IP stack processor 1842 includes a loopback interface 1852.

In some embodiments, the host 1800 is a host machine on a multi-tenant datacenter or a single tenant enterprise network. The processes running on the host are run in a user space 1810 or a kernel space 1820. The user space 1810 and kernel space 1810 processes use different APIs of the spaces to operate.

In the user space 1810, the host 1800 runs set of processes 1830 and 1832. The set of processes 1830 include instantiations of three different processes (processes 1, 2, and 3). The set of processes 1832 include separate instantiations of the same processes as set of processes 1830 (processes 1, 2, and 3). To distinguish between the sets of processes 1830 and 1832, the processes of set of process 1830 are written as "1A", "2A", and "3A", while the processes of set of process 1832 are written as "1B", "2B", and "3B".

In the illustrated embodiment, the TCP/IP stack processor 1840 provides a path of communication between the processes of set of processes 1830. As an example of such communications, the TCP/IP stack processor 1840 receives a data packet 1860 from process 1A to be sent to process 3A. The TCP/IP stack processor 1840 then formats the data packet 1860 as an IP packet 1870 addressed to an IP address of process 3A. The TCP/IP stack processor 1840 then sends the IP packet 1870 through the loopback interface 1850. The TCP/IP stack processor 1840 receives the IP packet 1870 from the loopback interface 1850 and parses the IP packet 1870 to determine a destination for the data contained in the IP packet 1870. The TCP/IP stack processor 1840 then converts IP packet 1870 back into a copy of data packet 1860 and sends data packet 1860 to process 3A.

Independently of the transmission of data from process 1A to 3A, the TCP/IP stack processor 1842 receives a data packet 1862 from process 1B to be sent to process 3B. The TCP/IP stack processor 1842 then formats the data packet 1862 as an IP packet 1872 addressed to an IP address of process 3B. The TCP/IP stack processor 1842 then sends the IP packet 1872 through the loopback interface 1852. The TCP/IP stack processor 1842 receives the IP packet 1872 from the loopback interface 1852 and parses the IP packet 1872 to determine a destination for the data contained in the IP packet 1872. The TCP/IP stack processor 1842 then converts IP packet 1872 back into a copy of data packet 1862 and sends data packet 1862 to process 3B.

Figure 19:
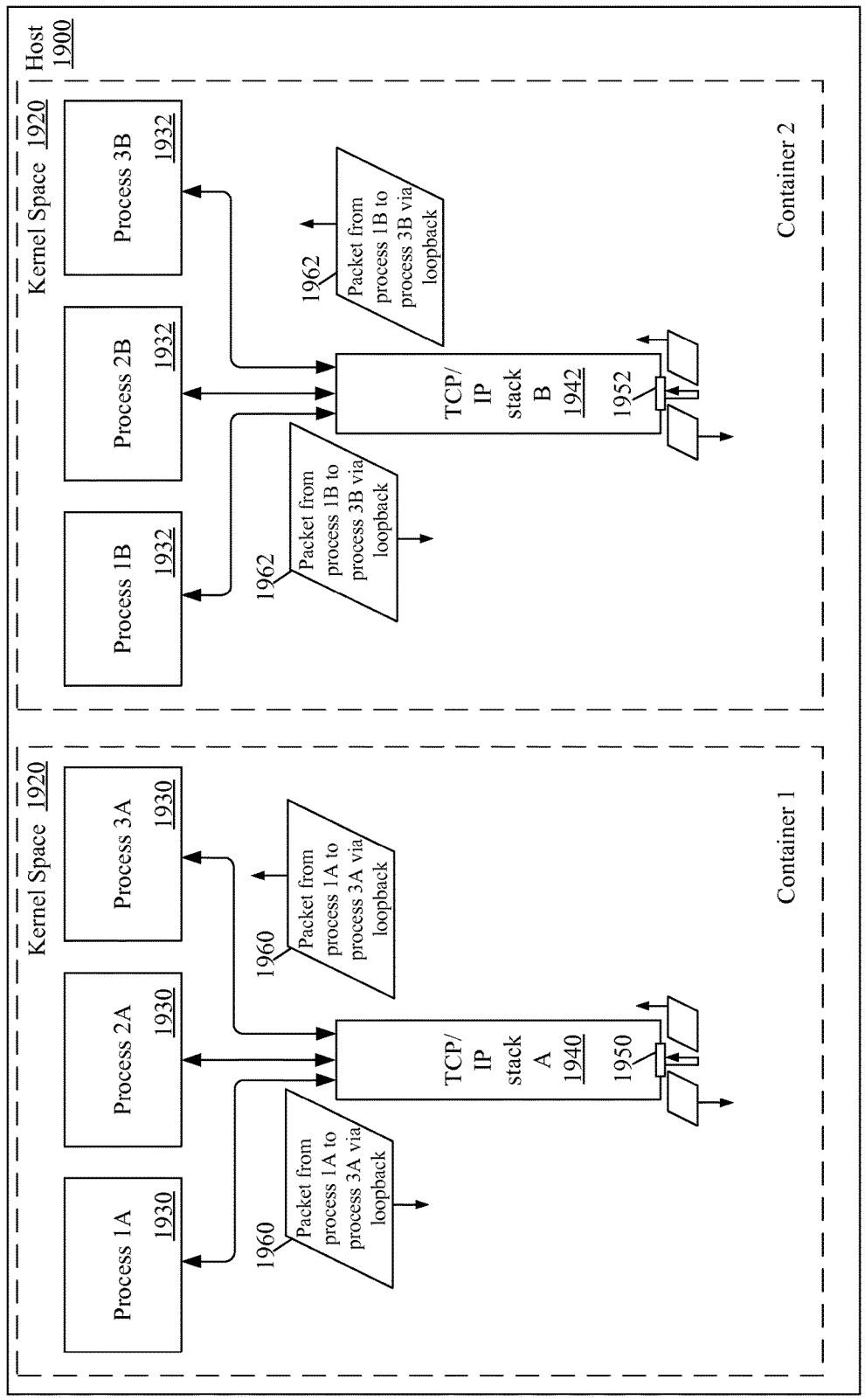
FIG. 19 illustrates a system of some embodiments that provides multiple TCP/IP stack processors with loopback interfaces for multiple sets of processes running in a kernel space of a host.

Although FIG. 18 illustrates TCP/IP stack processors that provide loopback interfaces for processes running in a user space, in some embodiments TCP/IP stack processors provide loopback interfaces for processes running in a kernel space. FIG. 19 illustrates a system of some embodiments that provides multiple TCP/IP stack processors with loopback interfaces for multiple sets of processes running in a kernel space of a host. The figure includes a host 1900 with a kernel space 1920. Process sets 1930 and 1932 run in the kernel space 1920. The processes of process set 1930 use TCP/IP stack processor 1940 and loopback interface 1950 to send data packets 1960 between the processes of the set 1930. The processes of process set 1932 use TCP/IP stack processor 1942 and loopback interface 1952 to send data packets 1962 between the processes of the set 1932. Although FIGS. 18 and 19 show embodiments in which all processes assigned to one TCP/IP stack processor are either all in a user space (see, FIG. 18) or all in a kernel space (see, FIG. 19) in some embodiments a TCP/IP stack processor is assigned to a set of processes that includes both user space processes and kernel space processes.

Although many of the preceding figures include two spaces on a host, a user space and a kernel space, in some embodiments the hosts implement more than two spaces. That is, in some embodiments, the hosts implement APIs that provide different characteristics for more than two spaces and run different processes in each of the available spaces. In some embodiments, the processes in each run space have different restrictions and/or access to different resources than the processes in each other run space.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
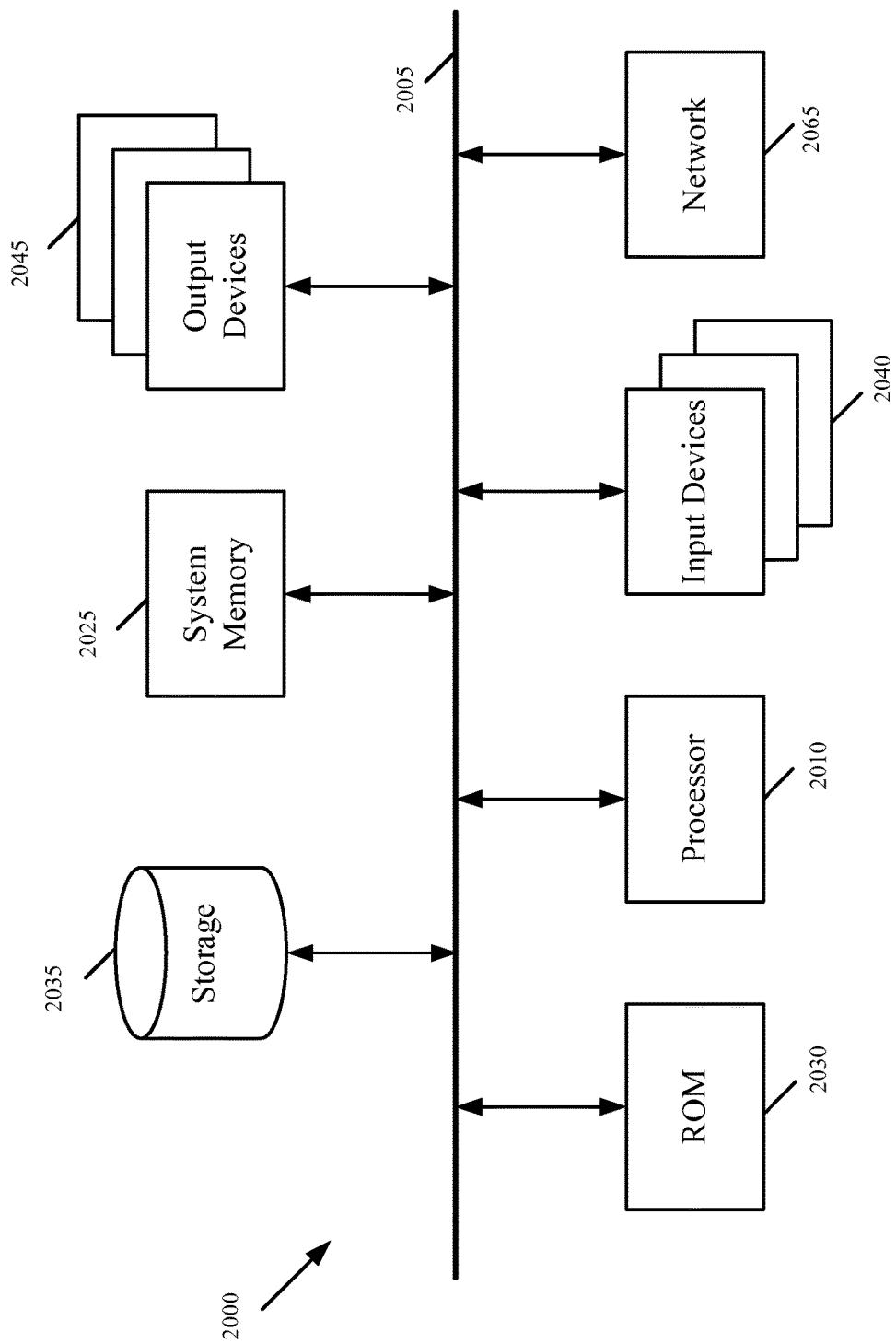
FIG. 20 conceptually illustrates an electronic system with which some embodiments of the invention are implemented.

FIG. 20 conceptually illustrates an electronic system 2000 with which some embodiments of the invention are implemented. The electronic system 2000 can be used to execute any of the control, virtualization, or operating system applications described above. The electronic system 2000 may be a computer (e.g., a desktop computer, personal computer, host machine, tablet computer, server computer, mainframe, a blade computer etc.), phone, PDA, or any other sort of electronic device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieves instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieves instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"). The output devices 2045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "host", "machine", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, FIGS. 5, 6, 7, 12, 14, and 17 conceptually illustrates processes. The specific operations of the processes may not be performed in the exact order shown and described. The specific operations may not be performed in one continuous series of operations, and different specific operations may be performed in different embodiments. Furthermore, the processes could be implemented using several sub-processes, or as part of larger macro processes.

What is claimed is:

1. A method of implementing TCP/IP stacks on an electronic computing device that implements a plurality of TCP/IP stacks, the method comprising:
    allocating a first amount of memory resources for a first TCP/IP stack for a first process executing on the device outside of any virtual machine;
    allocating a second amount of memory resources for a second TCP/IP stack for a second process executing outside of any virtual machine, said second amount of resources separate from the first amount of memory resources;
    implementing the first TCP/IP stack with the first amount of memory resources; and
    implementing the second TCP/IP stack with the second amount of memory resources,
    wherein memory resources allocated to a particular TCP/IP stack are not available for use by any other TCP/IP stack.

2. The method of claim 1, wherein at least one of the first and second processes is a storage process.

3. The method of claim 2, wherein the storage process is one of a network file system and a virtual storage area network.

4. The method of claim 1, wherein the first process is a storage process and the second process is a virtual machine migration process.

5. The method of claim 1, wherein the first amount of memory resources is determined by a configuration file of the first TCP/IP stack and the second amount of memory resources is determined by a configuration file of the second TCP/IP stack.

6. The method of claim 1, wherein the first amount of memory resources is determined based on resource allocation requirements of a plurality of TCP/IP stacks.

7. The method of claim 6, wherein the plurality of TCP/IP stacks comprises a plurality of presently implemented TCP/IP stacks.

8. The method of claim 6, wherein the plurality of TCP/IP stacks comprises a plurality of presently implemented TCP/IP stacks and a plurality of presently unimplemented TCP/IP stacks with known resource allocation requirements.

9. The method of claim 1, wherein said implementing the first and second TCP/IP stacks is performed by the electronic device automatically during a boot up of the electronic device.

10. A non-transitory machine readable medium storing a program which when executed by at least one processing unit implements a plurality of TCP/IP stacks, outside of any virtual machine, the program comprising sets of instructions for:
    allocating a first amount of memory resources for a first TCP/IP stack for a first process executing on the device outside of any virtual machine; and
    allocating a second amount of memory resources for a second TCP/IP stack for a second process executing outside of any virtual machine, said second amount of resources separate from the first amount of memory resources,
    implementing the first TCP/IP stack with the first amount of memory resources; and
    implementing the second TCP/IP stack with the second amount of memory resources,
    wherein memory resources allocated to a particular TCP/IP stack are not available for use by any other TCP/IP stack.

11. The non-transitory machine readable medium of claim 10, wherein the first and second processes are hypervisor service processes.

12. The non-transitory machine readable medium of claim 10, the program further comprising a set of instructions for implementing connections with the first amount of memory resources and the second amount of memory resources.

13. The non-transitory machine readable medium of claim 10, the program further comprising a set of instructions for implementing sockets with the first amount of memory resources and the second amount of memory resources.

14. The non-transitory machine readable medium of claim 10, wherein the first amount of memory resources is equal to the second amount of memory resources.

15. The non-transitory machine readable medium of claim 10, wherein the first amount of memory resources is different from the second amount of memory resources.

16. The non-transitory machine readable medium of claim 15, wherein the first amount of memory resources is determined by a configuration file of the first TCP/IP stack and the second amount of memory resources is determined by a configuration file of the second TCP/IP stack.

17. The non-transitory machine readable medium of claim 15, wherein the first amount of memory resources is determined based on resource allocation requirements of a plurality of TCP/IP stacks.

18. An electronic device implementing a first service and a second service, the electronic device comprising:
    at least one processing unit; and
    a non-transitory machine readable medium storing a program that when executed by the at least one processing units implements a plurality of TCP/IP stacks outside of any virtual machine on the electronic device, the program comprising sets of instructions for:
        allocating a first amount of memory resources to a first TCP/IP stack executing outside of any virtual machine to process data from the first service into IP packets;

allocating a second amount of memory resources separate from the first amount of memory resources to a second TCP/IP stack outside of any virtual machine to process data from the second service into IP packets;

implementing the first TCP/IP stack with the first amount of resources to prevent data output operations of the first service from impacting the second amount of resources; and implementing the second TCP/IP stack with the second amount of resources to prevent data operations of the second service from impacting the first amount of resources.

19. The electronic device of claim 18, wherein the first amount of memory resources comprises a first memory space and the second amount of memory resources comprises a second memory space separate from the first memory space.

20. The electronic device of claim 18, the program further comprising sets of instructions for implementing connections and sockets with the first amount of memory resources and the second amount of memory resources.

21. The electronic device of claim 18, wherein the first service and the second service run on a kernel space on the electronic device.

* * * * *